United States Patent [19]
Yasuda et al.

[11] Patent Number: 5,972,276
[45] Date of Patent: Oct. 26, 1999

[54] METHOD FOR THE INJECTION MOLDING OF A RESIN

[75] Inventors: Kazuharu Yasuda, Yokohama; Hideki Naruse, Kawasaki; Susumu Imai, Zama, all of Japan

[73] Assignee: Asahi Kasei Kogyo Kabushiki Kaisha, Osaka, Japan

[21] Appl. No.: 08/943,183

[22] Filed: Oct. 3, 1997

[30] Foreign Application Priority Data

Oct. 4, 1996 [JP] Japan ..................................... 8-263896

[51] Int. Cl.⁶ .................................................. B29C 45/00
[52] U.S. Cl. .......................... 264/500; 425/812; 425/130
[58] Field of Search ................................. 264/500, 572, 264/520, 328.1, 530; 425/812, 130

[56] References Cited

U.S. PATENT DOCUMENTS

| | | |
|---|---|---|
| 5,273,707 | 12/1993 | Carroll . |
| 5,344,596 | 9/1994 | Hendry ..................... 264/500 |
| 5,716,560 | 2/1998 | Heuchert et al. ........... 264/572 |
| 5,730,926 | 3/1998 | Matsumoto et al. ......... 264/500 |

FOREIGN PATENT DOCUMENTS

| | | | |
|---|---|---|---|
| 50-75247 | 6/1975 | Japan . | |
| 60-8022 | 1/1985 | Japan ...................... 264/500 |
| 7-31484 | 12/1995 | Japan ...................... 264/500 |
| WO9314918 | 8/1993 | WIPO . | |
| WO9602379 | 2/1996 | WIPO . | |

*Primary Examiner*—Catherine Timm
*Attorney, Agent, or Firm*—Birch, Stewart, Kolasch & Birch, LLP

[57] ABSTRACT

Disclosed is a method for the injection molding of a resin to produce a shaped resin article having a thick portion biasedly, wherein an excess filling of the cavity of a mold is effected to form a molten resin mass having opposite, first and second surfaces respectively facing opposite, first and second inner walls of the mold cavity, the mold having a specific structure in which a gas-release passage is formed in association with the mold cavity and with a mating surface of the mold, which gas-release passage has an inner opening in an inner wall surface of the mold cavity and communicates with the outside of the mold, and a pressurized gas is introduced into the mold cavity on a side of the first surface of the molten resin mass, thereby forming a closed space which is filled with the pressurized gas and separated from the gas-release passage through the molten resin mass, so that the pressurized gas filled in the closed space urges the second surface of the molten resin mass to be pressed against the second inner wall of the mold cavity.

7 Claims, 13 Drawing Sheets p

METHOD FOR THE INJECTION MOLDING OF A RESIN

BACKGROUND OF THE INVENTION

1. Field of the Invention

The present invention relates to a method for the injection molding of a resin. More particularly, the present invention is concerned with a method for the injection molding of a resin to produce a shaped resin article having a thick portion biasedly and having an improved surface finish. In the method of the present invention, an excess filling of the cavity of a mold is effected to form a molten resin mass having opposite, first and second surfaces respectively facing opposite, first and second inner walls of the mold cavity, the mold having a specific structure in which a gas-release passage is formed in association with the mold cavity and with a mating surface of the mold, wherein the gas-release passage has an inner opening in an inner wall surface of the mold cavity and communicates with the outside of the mold, and a pressurized gas is introduced into the mold cavity on a side of the first surface of the molten resin mass, thereby forming a closed space which is filled with the pressurized gas and separated from the gas-release passage through the molten resin mass, so that the pressurized gas filled in the closed space urges the second surface of the molten resin mass to be pressed against the second inner wall of the mold cavity. The injection molding method of the present invention is advantageous not only in that the occurrence of a sink mark on a front surface of a shaped resin article can be prevented without causing the problem of the occurrence of burrs (flashes) thereon, but also in that there is no need for use of a completely gas-tightly sealed mold which requires a high equipment cost and a high maintenance cost, and that an injection molding can be performed with a relatively low excess-filling ratio, as compared to the conventional excess-filling injection molding method.

2. Prior Art

It is widely known that when a shaped resin article which has a relatively large thickness or has a locally protruded portion on a back surface thereof is produced by injection molding a molten resin, a dent, i.e., the so-called "sink mark", is likely to occur on a front surface of the shaped resin article in accordance with the volume shrinkage of the molten resin during the cooling thereof. For preventing the occurrence of a sink mark on a front surface of a shaped resin article, a method has conventionally been known, wherein when an injection pressure is applied, an increased level of pressure is used, and, after the injection, the application of pressure is continued while cooling the injected molten resin (this method is hereinafter referred to as "resin pressure method".). In this resin pressure method, the applied injection pressure is generally in the range from 50 to 200 MPa in terms of the maximum resin pressure in the mold cavity.

However, as described in Japanese Patent Application Laid-Open Specification No. 50-75247, the above-mentioned resin pressure method has problems. For example, it is difficult to appropriately apply pressures in two stages so as to achieve the effects aimed at by the resin pressure method, so that the molding operation tends to become cumbersome and time-consuming. Furthermore, in the resin pressure method, the shaped resin articles produced are likely to have burrs formed along a parting line of the mold. Therefore, the removal of the burrs is necessary, thereby inevitably causing a problem such that additional work or steps are necessary in a molding operation. On the other hand, when a relatively low pressure is employed in the resin pressure method in order to prevent the occurrence of burrs, sink marks are likely to occur at a portion of a shaped resin article, which is positioned away from a gate in a mold cavity, that is, at a portion on which a satisfactory resin pressure cannot be obtained.

For solving the problems of the resin pressure method, the above-mentioned Japanese Patent Application Laid-Open Specification No. 50-75247 proposes a gas-assisted injection molding method in which a mold is used which comprises a fixed mold half and a movable mold half with its inner wall having a core protruding therefrom toward the inner wall of the fixed mold half, so that a concave mold cavity defined by the fixed mold half and the movable mold half having the core portion is provided. The core has a hole extending in the direction of the longitudinal axis thereof, and the hole has a poppet valve disposed at the top thereof. In this method, after a molten resin has been injected into a mold cavity, the poppet valve is operated to push up the molten resin mass, so that a space is produced between the core and the inner surface of the concave molten resin mass formed in the concave mold cavity, and then a pressurized gas is injected through the poppet valve into the above-mentioned space, thereby pressing the outer surface of the molten resin mass against the cavity inner wall remote from the core. This gas-assisted injection molding method is intended to prevent the occurrence of sink marks by using a pressurized gas, instead of using the two-stage application of pressure as in the above-mentioned resin pressure method which, as described above, is likely to be unfavorably accompanied by the occurrence of burrs along a parting line of a mold cavity. In Japanese Patent Application Laid-Open Specification No. 50-75247, there is no description about the amount of molten resin to be injected.

International Patent Application Publication No. WO 90/06220 (corresponding to U.S. Pat. No. 5,273,707 and EP No. 400135) discloses a gas-assisted injection molding method in which a molten resin is injected into the mold cavity in a volume smaller than the volume of the mold cavity, specifically in a volume of 90% to 95% of the volume of the mold cavity, and then a pressurized gas is introduced into the remaining space in the cavity. However, a gap is likely to be formed between the inner wall (remote from the side of the gas introduction) of the mold cavity and the molten resin injected into the mold cavity. Hence, the gas intrudes into the gap, causing the occurrence of sink marks.

Further, the gas which had intruded into the gap is likely to escape from the mold cavity through a parting line of the mold cavity, so that the effect of the pressurized gas becomes insufficient to prevent the occurrence of sink marks.

As is apparent from the above, in the conventional gas-assisted injection molding methods, for preventing the occurrence of burrs and for assuring a space in a mold cavity into which a pressurized gas is to be introduced, a molten resin is injected into a mold cavity in a volume equal to or smaller than the volume of the mold cavity.

International Patent Application Publication No. WO 93/14918 discloses the use of a mold having a sealed construction in which not only a parting line between a movable mold half and a fixed mold half, but also a space between an ejector pin and an inner wall of an ejector pin slide hole provided in the movable mold half, is sealed. In addition, this patent document teaches that a weir formed of a protrusion (such as a protrusion having a triangular cross-section) is provided around a portion of the inner wall of a mold cavity on which it is intended to receive a gas pressure, so that a gas pressure can be effectively applied to a desired portion of an injected molten resin for preventing the occurrence of a sink mark.

However, with the use of the mold having a sealed construction, it is impossible to prevent an unfavorable intrusion of a pressurized gas into a portion of the mold cavity on a side of the surface of an injected molten resin mass which surface should be pressed against a cavity inner wall facing it. Therefore, close contact between the above-mentioned surface of the molten resin mass and the cavity inner wall facing it cannot be achieved, resulting in an unsatisfactory surface finish of the resultant shaped resin article. In addition, since a weir is provided on the inner wall of the mold cavity, the freedom of design of a shaped article to be produced is inevitably limited. Further, it is noted that in International Patent Application Publication No. WO 93/14918, it is described that the mold cavity is filled or nearly filled with a molten resin.

International Patent Application Publication No. WO 96/02379 discloses a method for the non-resin fluid-assisted injection molding of a resin to produce a shaped resin article, wherein an excess filling of a mold cavity of a sealed mold with a molten resin is effected in a specific excess filling ratio [corresponding to an excess ratio of a resin by an amount corresponding to 30 to 90% of a difference between the volume of the mold cavity and a volume exhibited by the resin in accordance with a shrinkage thereof when the molten resin filled in the mold cavity is cooled to room temperature], to thereby form a molten resin mass having opposite, first and second surfaces respectively facing opposite inner walls of the mold cavity, and a pressurized non-resin fluid is subsequently introduced into the mold cavity on a side of the first surface of the molten resin mass to thereby press the second surface of the molten resin mass against the cavity inner wall remote from the side of the introduction of the non-resin fluid. However, in this technique, it is requisite to use a mold having a tightly sealed construction, so that it becomes necessary to provide a sealed chamber in the mold to thereby seal a space between an ejector pin and an inner wall of an ejector pin slide hole provided in a movable mold half. Therefore, this technique has problems such that a mold having a complicated structure is required, and that for expelling the air or the gas out of the mold to transfer the air or the gas into the sealed chamber, it is necessary to inject a resin into the mold cavity in a relatively large excess amount or to inject a resin under high pressure.

With respect to the above-mentioned conventional molding methods using a pressurized gas (or non-resin fluid), there have been a tendency that the amount of the gas introduced into the mold cavity is controlled to be as small as possible, so as to render efficient the operation of the introduction of the gas, and a tendency that a mold having a tightly sealed construction is used, so as to prevent the escape of the gas from the mold cavity.

Recently, large-size shaped articles, such as automobile parts and casings of home electric appliances, have been in increasing demand. In order that the production cost may be reduced by rendering it unnecessary to conduct finishing works, such as painting and plating, it has been desired to produce a shaped resin article having an excellent surface finish, in which a sink mark is suppressed to a visually unnoticeable level and which exhibits excellent and uniform gloss and luster.

However, as described hereinabove, in the conventional injection molding methods, when a shaped resin article to be produced has a locally protruded portion on a back surface thereof at which the article has an increased thickness, the occurrence of a sink mark defect on a front surface thereof at a portion corresponding to the locally protruded portion cannot be satisfactorily suppressed without causing the problem of the occurrence of burrs.

SUMMARY OF THE INVENTION

In this situation, the present inventors have made extensive and intensive studies with a view toward solving the above-mentioned problems inevitably accompanying the prior art methods. As a result, it has unexpectedly been found that the problems accompanying the prior art can be solved by a method for the injection molding of a resin to produce a shaped resin article having a thick portion biasedly, wherein an excess filling of the cavity of a mold is effected to form a molten resin mass having opposite, first and second surfaces respectively facing opposite, first and second inner walls of the mold cavity, the mold having a specific structure in which the mold cavity has at least one recess in the first inner wall thereof, and a gas-release passage is formed in association with the mold cavity and with a mating surface of the mold, wherein the gas-release passage has an inner opening in an inner wall surface of the mold cavity and communicates with the outside of the mold, and a pressurized gas is introduced into the mold cavity on a side of the first surface of the molten resin mass, thereby forming a closed space which is filled with the pressurized gas and separated from the gas-release passage through the molten resin mass, so that the pressurized gas filled in the closed space urges the second surface of the molten resin mass to be pressed against the second inner wall of the mold cavity. By using this injection molding method, great advantages can be obtained not only in that the occurrence of a sink mark can be effectively prevented without the occurrence of burrs, thereby producing a shaped resin article having an excellent surface finish, but also in that there is no need for use of a completely gas-tightly sealed mold which requires a high equipment cost and a high maintenance cost, and that an injection molding can be performed with a relatively low excess-filling ratio, as compared to the conventional excess-filling injection molding method. Based on this novel finding, the present invention has been completed.

The foregoing and other objects, features and advantages of the present invention will be apparent from the following detailed description and appended claims taken in connection with the accompanying drawings.

BRIEF DESCRIPTION OF THE DRAWINGS

In the accompanying drawings:

FIG. 4(a) and FIG. 4(b) are enlarged diagrammatic cross-sectional views of two forms of the gas introduction pin which are, respectively, disposed in holes provided in movable mold halves;

FIG. 9(a) is a diagrammatic cross-sectional view of one form of the biasedly thick portion of a shaped resin article produced by the method of the present invention, showing that a hollow is formed within the thick portion;

FIG. 9(b) is a diagrammatic cross-sectional view of one form of the biasedly thick portion of a shaped resin article produced by the conventional internal gas injection molding method (hollow-forming gas injection molding method), showing that a hollow formed in the thick portion invades into other portions;

FIG. 13(a) is a diagrammatic bottom view of the shaped resin article shown in FIG. 12;

FIG. 13(b) is a diagrammatic cross-sectional view of the shaped resin article of FIG. 13(a), taken along the line XIII—XIII;

FIG. 13(c) is a diagrammatic cross-sectional view of the shaped resin article of FIG. 13(a), taken along the line XIII'—XIII';

In FIG. 1 through FIG. 21, like parts or portions are designated by like numerals and characters.

Description of Reference Numerals and Characters

Figure 1:
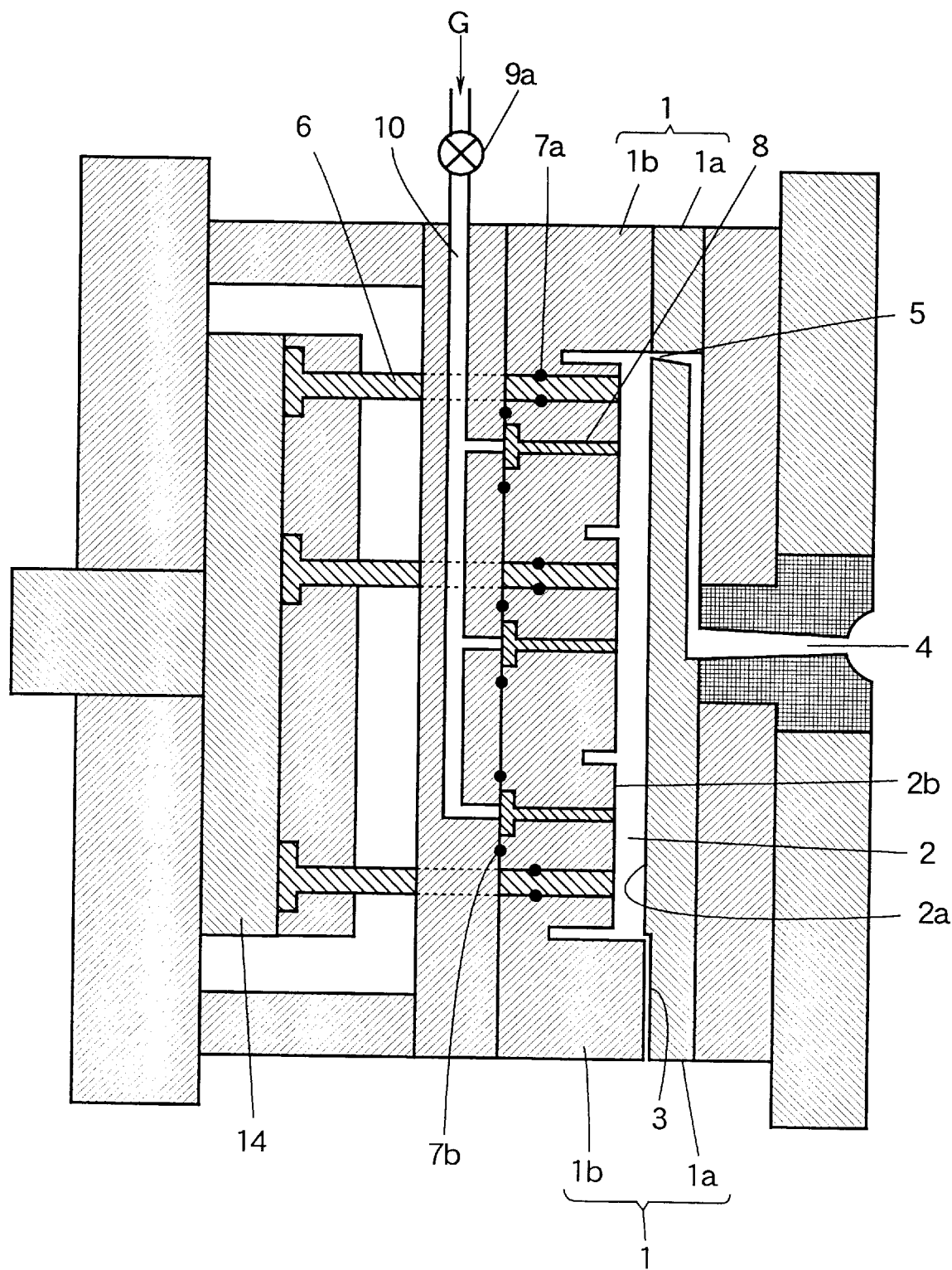
FIG. 1 is a diagrammatic cross-sectional view of one form of a mold to be used in the present invention, showing an example of a gas-release passage formed in association with the mold cavity and with a mating surface of the mold.

1: Mold
1a: Fixed mold half
1b: Movable mold half
2: Mold cavity
2': Molten resin
2a: Second inner wall of mold cavity
2b: First inner wall of mold cavity
3: Gas-release passage (formed along the mating surface of the mold)
4: Resin inlet (sprue)
5: Gate of mold cavity
6: Ejector pin
7a, 7b, 7c, 7d and 7e: O-ring
8: Gas introduction pin
9a: Gas valve
9b: Gas valve
10: Gas introduction line
10a: Gas introduction line
10b: Gas introduction line
11: Hole provided in movable mold half, having a gas introduction pin disposed therein
12: Portion of a molten resin corresponding to a rib of a shaped resin article
12': Portion of first inner wall of a mold cavity near portion 12 of a molten resin
13: Portion of a molten resin corresponding to a side wall of a shaped resin article
14: Ejector pin-supporting plate
15: Sealed chamber
16: Hollow in a shaped article produced by the method of the present invention
16': Hollow in a shaped article produced by the conventional internal gas injection molding method
17: Gas introduction hollow needle segment
18: Hollow
19: Shaped resin article
20: Large thickness rib
21a: height-supplement rib
21b: height-supplement rib
22: Support rib
23: Bottom wall of a shaped resin article
24a: Side wall of a shaped resin article
24b: Side wall of a shaped resin article
24c: Side wall of a shaped resin article
25: Portion of a shaped resin article corresponding to a molten resin/first inner wall interface
26: Portion of a shaped resin article corresponding to a gas inlet
27a: Side wall of a shaped resin article
27b: Side wall of a shaped resin article
27c: Side wall of a shaped resin article
27d: Side wall of a shaped resin article
28: Support rib
29: Large thickness rib
30: Large thickness rib
31a: Large thickness rib
31b: Large thickness rib 32: Side wall of a shaped resin article
33: Support rib
34: Large thickness rib
35: Side wall of a shaped resin article
36a: Support rib
36b: Support rib
37a: Support rib
37b: Support rib
37c: Support rib
G: Gas
G': Portion of a shaped resin article corresponding to gas inlet
H and I: Indication of the position of the parting line of a mold
a, b, c, d, e, f and g: Ribs
h and i: Ribs
j: Large thickness boss
k, l, m, n, o and p: Ribs
s: Space between the gas introduction pin and the inner wall of the hole having the pin disposed therein

DETAILED DESCRIPTION OF THE INVENTION

According to the present invention, there is provided a method for the injection molding of a resin to produce a shaped resin article having a thick portion biasedly and having an improved surface finish, which comprises:

(1) providing a mold comprising a fixed mold half and a movable mold half mating with the fixed mold half to thereby provide a mold cavity defined by an inner wall of the fixed mold half and an inner wall of the movable mold half, the mold cavity having opposite, first and second inner walls and communicating with a resin inlet and with a gas inlet, the first inner wall of the mold cavity having at least one recess, the mold having a gas-release passage formed in association with the mold cavity and with a mating surface of the mold, wherein the gas-release passage has an inner opening in an inner wall surface of the mold cavity and communicates with the outside of the mold;

(2) injecting a resin in a molten form, under preselected temperature and pressure conditions for the injection, into the mold cavity of the mold through the resin inlet in an amount larger than the weight (VW) of the molten resin having a resin volume equal to the volume of the mold cavity, wherein the resin volume is as measured at the preselected injection temperature under atmospheric pressure, thereby effecting an excess filling of the mold cavity with the molten resin to form a molten resin mass having opposite, first and second surfaces respectively facing the first and second inner walls of the mold cavity, while allowing a gas present in the mold cavity to be released to the outside of the mold cavity through the gas-release passage, wherein the first surface of the molten resin mass and the first inner wall of the mold cavity form a molten resin/first inner wall interface therebetween; and (3) introducing a pressurized gas, which is inert to the resin, into the mold cavity on a side of the first surface of the molten resin mass to expand the molten resin/first inner wall interface, thereby forming a closed space which is filled with the pressurized gas and separated from the gas-release passage through the molten resin mass, so that the pressurized gas filled in the closed space urges the second surface of the molten resin mass to be pressed against the second inner wall of the mold cavity, wherein the first and second surfaces of the molten resin mass, respectively, correspond to back and front surfaces of a shaped resin article to be injection molded.

For easy understanding of the present invention, the essential features and various embodiments of the present invention are enumerated below.

1. A method for the injection molding of a resin to prosduce a shaped resin article having a thick portion biasedly and having an improved surface finish, which comprises:

(1) providing a mold comprising a fixed mold half and a movable mold half mating with the fixed mold half to thereby provide a mold cavity defined by an inner wall of the fixed mold half and an inner wall of the movable mold half, the mold cavity having opposite, first and second inner walls and communicating with a resin inlet and with a gas inlet, the first inner wall of the mold cavity having at least one recess, the mold having a gas-release passage formed in association with the mold cavity and with a mating surface of the mold, wherein the gas-release passage has an inner opening in an inner wall surface of the mold cavity and communicates with the outside of the mold;

(2) injecting a resin in a molten form, under preselected temperature and pressure conditions for the injection, into the mold cavity of the mold through the resin inlet in an amount larger than the weight (VW) of the molten resin having a resin volume equal to the volume of the mold cavity, wherein the resin volume is as measured at the preselected injection temperature under atmospheric pressure, thereby effecting an excess filling of the mold cavity with the mol ten resin to form a molten resin mass having opposite, first and second surfaces respectively facing the first and second inner walls of the mold cavity, while allowing a gas present in the mold cavity to be released to the outside of the mold cavity through the gas-release passage, wherein the first surface of the molten resin mass and the first inner wall of the mold cavity form a molten resin/first inner wall interface therebetween; and (3) introducing a pressurized gas, which is inert to the resin, into the mold cavity on a side of the first surface of the molten resin mass to expand the molten resin/first inner wall interface, thereby forming a closed space which is filled with the pressurized gas and separated from the gas-release passage through the molten resin mass, so that the pressurized gas filled in the closed space urges the second surface of the molten resin mass to be pressed against the second inner wall of the mold cavity, wherein the first and second surfaces of the molten resin mass, respectively, correspond to back and front surfaces of a shaped resin article to be injection molded.

2. The method according to item 1 above, wherein the gas-release passage is a slit formed along the mating surface of the mold.

3. The method according to item 2 above, wherein the slit has, in a cross-section thereof, a thickness of from 1/100 mm to 1/10 mm at least in the vicinity of the inner opening of the gas-release passage.

4. The method according to any one of items 1 to 3 above, wherein the weight of the molten resin injected into the mold cavity is 101% or more, based on the weight (VW) of the molten resin.

5. The method according to any one of items 1 to 4 above, wherein, after the injection of the molten resin in step (2), a predetermined holding pressure is applied to the injected molten resin.

6. The method according to item 5 above, wherein the predetermined holding pressure continues to be applied during the introduction of a pressurized gas in step (3).

In step (1) of the method of the present invention, there is provided a mold comprising a fixed mold half and a movable mold half. The mold has a mold cavity having opposite, first and second inner walls and communicating with a resin inlet and with a gas inlet. The first inner wall of the mold cavity has at least one recess. The mold has a specific structure in which it has a gas-release passage formed in association with the mold cavity and with a mating surface of the mold, and the gas-release passage has an inner opening in an inner wall surface of the mold cavity and communicates with the outside of the mold. That is, an inner end of the gas-release passage opens at the inner wall surface of the mold cavity, whereas an outer end of the gas-release passage opens at the outer surface of the mold.

In step (2) of the method of the present invention, an excess filling of the mold cavity is effected with a molten resin to form a molten resin mass having opposite, first and second surfaces respectively facing the first and second inner walls of the mold cavity, while allowing a gas present in the mold cavity to be released to the outside of the mold cavity through the gas-release passage. Specifically, a resin in a molten form is injected, under preselected temperature and pressure conditions for the injection, into the mold cavity of the mold through the resin inlet in an amount larger than the weight of the molten resin having a resin volume equal to the volume of the mold cavity, wherein the weight of the molten resin having such a resin volume is defined as the weight (VW) herein. The above-mentioned resin volume is as measured at the temperature preselected for the injection under atmospheric pressure. It is preferred that the weight of the molten resin injected into the mold cavity is 101% or more, more preferably 103% or more, based on the above-mentioned weight (VW) of the molten resin.

The first surface of the molten resin mass and the first inner wall of the mold cavity form a molten resin/first inner wall interface therebetween.

By virtue of the presence of the gas-release passage of the mold, upon the injection of a molten resin into the mold cavity, a gas present in the mold cavity is allowed to be released to the outside of the mold cavity through the gas-release passage. If any gas is emitted from the molten resin into the mold cavity, such a gas is also allowed to be released to the outside of the mold cavity through the gas-release passage.

As the gas-release passage, a gap which is present on the mating surface of the mold may be used as such, as long as a gas present in the mold cavity is allowed to be released to the outside of the mold cavity therethrough. For facilitating the gas release, it is preferred that the gas-release passage is a slit formed along the mating surface of the mold. The position of the inner opening of the gas-release passage is not particularly limited; however, when the gas-release passage is a slit or the like formed along the mating surface of the mold, it is preferred that the inner opening of the gas-release passage is positioned near an end portion of the mold cavity which is remote from the molten resin introduction side of the mold cavity. It is also preferred that the inner opening of the gas-release passage is positioned on the side of the second inner wall of the mold cavity, rather than on the side of the first inner wall of the mold cavity, because, upon introducing the molten resin into the mold cavity, the first inner wall is adapted to form the molten resin/first inner wall interface together with the first surface of the molten resin mass.

The present inventors have for the first time found that, by using the above-mentioned specific mold having good gas-release characteristics, the problems accompanying the prior art can be solved. That is, it has unexpectedly been found that, with the use of such a mold having good gas-release characteristics, when the mold cavity of the mold is filled in excess with a molten resin and subsequently a pressurized gas is introduced into the mold cavity on a side of the first surface of the molten resin mass, a closed space which is filled with the pressurized gas can surprisingly be formed in the mold cavity. It is presumed that the inner opening of the gas-release passage is closed by the molten resin mass. It is very surprising that the above-mentioned closed space which is filled with the pressurized gas can be formed in the mold cavity without using sealing means (such as O-rings) provided on the mating surface of a mold. For achieving the excellent effects of the present invention, it is requisite that use be made of a mold having the above-mentioned specific structure exhibiting good gas-release characteristics, and that the mold be filled in excess with a molten resin.

With respect to the excess filling of the mold cavity with a molten resin, it has been found that the effects of the present invention can be achieved even when the excess ratio of the injected molten resin is very small. However, it has also been found that, for enhancing the gas-sealing effect of the injected molten resin so as to increase the sink-mark preventing effect, it is preferred that the weight of the molten resin injected into the mold cavity is 101 to 110%, more preferably 103 to 107%, based on the above-defined weight (VW) of the molten resin. When the weight of the molten resin injected into the mold cavity is more than 110%, based on the above-defined weight (VW) of the molten resin, burrs are likely to occur.

The reason why a mold cavity can be filled in excess with a resin resides in that a molten resin can be compressed under the injection pressure. With respect to the excess filling of a mold cavity with a molten resin, reference can be made to WO 96/02379, which discloses the conventional excess-filling injection molding method.

In step (3) of the method of the present invention, a pressurized gas, which is inert to the resin, is introduced into the mold cavity on a side of the first surface of the molten resin mass to expand the molten resin/first inner wall interface, thereby forming a closed space which is filled with the pressurized gas and separated from the gas-release passage through the molten resin mass, so that the closed space urges the second surface of the molten resin mass to be pressed against the second inner wall of the mold cavity.

The introduction of a gas into the mold cavity can be effected through a gas inlet means disposed on the side of the first inner wall of the mold cavity. For example, the introduction of a gas into the mold cavity can be effected through a gap between the surface of a pin and the wall surface of a hole which is provided in a mold half and has the pin disposed therein. Alternatively, the introduction of a gas can be effected through a porous sintered body embedded in a mold half. In still the alternative, the introduction of a gas can be effected through a poppet valve or the like which can open on the side of the first inner wall of the mold cavity. In the method of the present invention, it is preferred that the introduction of a gas is effected by the above-mentioned method using a pin disposed in a hole provided in a mold half. The reason for this resides in that the excess filling of a mold cavity with a molten resin produces a high resin pressure in the mold cavity, and, in general, the introduction of a gas into a mold cavity filled with a molten resin under a high pressure can be most easily effected by using such a pin. This pin for gas introduction may be a gas-introduction pin (which will be described below) designed and provided for this purpose. Also, an ejector pin (which will be described below) may be used for the purpose of gas introduction.

The term "shaped resin article having a thick portion biasedly" used in the present invention means any shaped resin article having, on a back surface thereof, a locally protruded portion at which the shaped resin article has an increased thickness. Examples of locally protruded portions include a rib, a boss and a combination thereof. Further, the biasedly "thick portion" of a shaped resin article may be one which covers a relatively wide area in the shaped resin article, as compared to a rib or a boss.

In the injection molding method of the present invention, it is preferred that, after the injection of a molten resin in step (2), a predetermined holding pressure is applied to the injected molten resin. This advantageously prevents the escape of the pressurized gas from the mold cavity and facilitates the formation of the above-mentioned closed space which is filled with the pressurized gas in the mold cavity. The application of the above-mentioned holding pressure can be performed by, for example, a method in which, just before or immediately after completion of the above-mentioned excess filling of the mold cavity with the molten resin, the injection pressure is partially removed to obtain and maintain a predetermined super-atmospheric pressure, so that the injected molten resin continues to be under the predetermined pressure after completion of the excess filling (the predetermined pressure maintained after the excess filling serves as a holding pressure).

With respect to the holding pressure applied to the injected molten resin, it is preferred that the holding pressure is 100 MPa or less, more preferably from 5 to 40 MPa. With respect to the time period for applying the holding pressure to the molten resin, the application of the holding pressure is generally conducted for 1 to 20 seconds, preferably 2 to 10 seconds.

In conventional internal gas injection molding methods (i.e., hollow-forming gas injection molding methods) in which a pressurized gas is introduced into the injected molten resin in a mold cavity, for efficiently conducting the introduction of the pressurized gas into the molten resin mass in the mold cavity, the application of a resin holding pressure has not been conducted. Also, in conventional gas press injection molding methods in which a pressurized gas is introduced between a molten resin mass and the inner wall of the mold cavity, for the same reason as in the internal gas injection molding methods, the application of the resin holding pressure has not been conducted. That is, conventionally, no attempt has ever been made to use, in combination, the introduction of a pressurized gas into the mold cavity and the application of the holding pressure to the injected molten resin. In fact, it has conventionally been considered to be difficult to successfully perform the injection molding by using, in combination, the pressurized gas and the holding pressure. However, in the method of the present invention, by the application of a holding pressure to the injected molten resin, it has surprisingly become possible to effectively prevent the injected molten resin from flowing back into a runner and resin inlet (sprue) of the mold (such a phenomenon leads to a lowering of the pressure of the molten resin at a portion thereof around the gate of the mold cavity, thereby allowing the pressurized gas to escape to the outside of the mold cavity through the gate). Further, as is seen from FIG. 5, by appropriately choosing the holding pressure, it becomes possible to prevent a corner portion of the closed space (which corner portion of the closed space is formed in correspondence with a corner portion of a shaped resin article to be produced which portion is formed around the base of the biasedly thick portion) from being locally, excessively expanded {a portion of the molten resin mass, which is squeezed by the locally excessively expanded portion of the closed space is hereinafter referred to simply as a "squeeze" (see, for example, the base portion of molten resin section 12 in FIG. 5)}. This prevention is advantageous because the squeeze disadvantageously lowers the strength of the shaped resin article. Further, by virtue of the above-mentioned effect achieved by the use of the holding pressure, the second surface of the molten resin mass (which corresponds to the front surface of the shaped resin article to be injection molded) can be uniformly pressed against the above-mentioned second inner wall of the mold cavity. As a result, it becomes possible to prevent the resultant shaped article from suffering a remaining stress which causes disadvantages, such as the warpage of the shaped resin article.

In the present invention, the application of a holding pressure to the injected molten resin is effective irrespective of whether the mold employed in the method of the present invention is a cold runner-type mold or a hot runner-type mold. When a hot runner-type mold is used, it is advantageous to use a mold having a gate (resin inlet) thereof provided with a valve, which is generally called a "valve gate" and functions to open and close the gate of the mold. By the use of such a valve gate, it becomes possible to prevent the pressurized gas from intruding into the hot runner of the mold and prevent the resin from flowing back to the gate of the mold.

Figure 9:
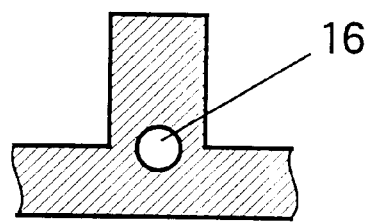
Figure 9:
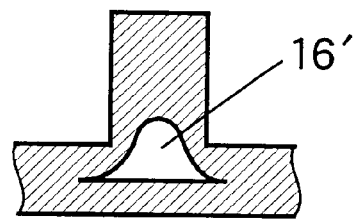

In the method of the present invention, if desired, depending on the injection pressure of a molten resin, the pressure of the pressurized gas, the shape and size of the biasedly thick portion of a shaped resin article to be produced and/or the like, it is possible that the pressurized gas is introduced into the molten resin mass at a portion thereof which corresponds to the biasedly thick portion of the shaped resin article to produce a shaped resin article having a partial cross-section as shown in FIG. 9(a), which has a hollow in the biasedly thick portion thereof. In the injection molding method of the present invention, by the introduction of the pressurized gas into the molten resin mass at a portion thereof which corresponds to the biasedly thick portion of the shaped resin article, the effect of preventing the occurrence of a sink mark on the front surface of the shaped resin article can be increased. Therefore, in this case, it becomes possible not only to surely prevent the occurrence of a sink mark on the front surface of a shaped resin article, but also to prevent the occurrence of non-uniformity in gloss and luster on the front surface of the shaped resin article, which is a problem accompanying the conventional hollow-forming gas injection molding method.

Figure 10:
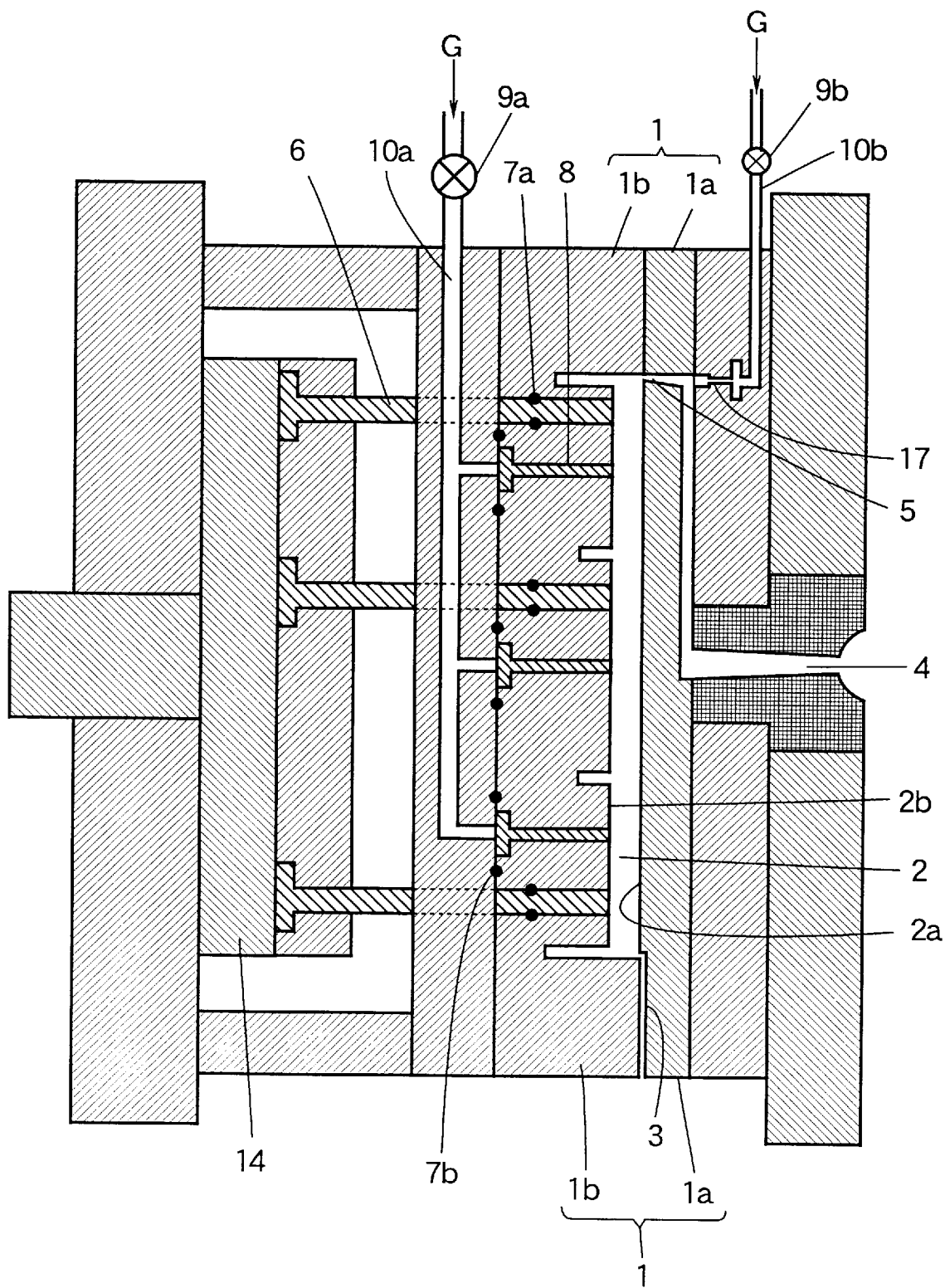
FIG. 10 is a diagrammatic cross-sectional view of a further form of a mold to be used in the method of the present invention.

Further, the method of the present invention may be combined with a conventional hollow-forming gas injection molding method to thereby produce a shaped, hollow resin article, in which a mold as shown in FIG. 10 is used. Specifically, in step (3) of method of the present invention, in addition to the above-mentioned pressurized gas used to form the closed space, a pressurized gas may be introduced into the molten resin mass in the mold cavity from a supply source (10b) which is different from a supply source (10a) for the pressurized gas used to form the closed space, so that a shaped, hollow resin article can be obtained.

Figure 11:
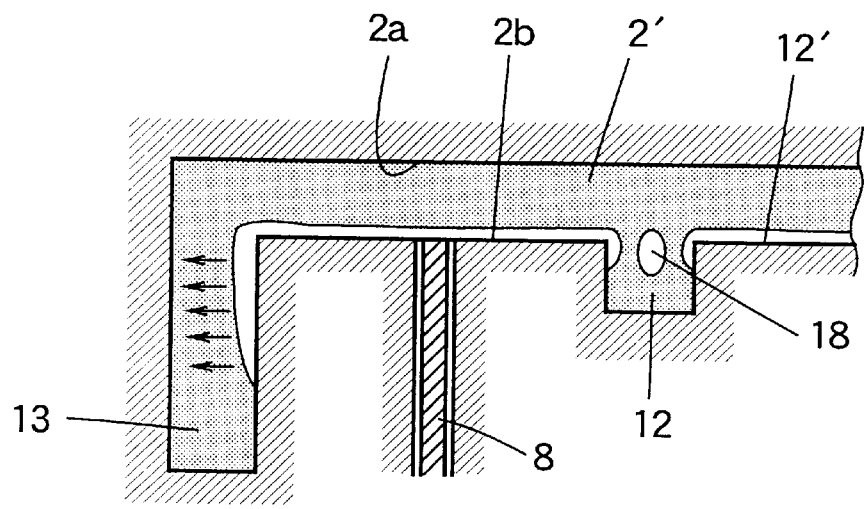
FIG. 11 is a diagrammatic view showing a further example as to how a pressurized gas urges the second surface of a molten resin mass to be pressed against the second inner wall of the mold cavity in the method of the present invention, wherein a part of the pressurized gas intrudes into the molten resin mass to form a hollow.

When the method of the present invention is combined with the hollow-forming gas injection molding method, it is preferred to form a hollow in a portion of the molten resin mass in the mold cavity which corresponds to the biasedly thick portion of the shaped resin article (see, for example, FIG. 11). In this case, various advantages can be achieved such that the entire area of the second surface of the molten resin mass (including a portion of the second surface of the molten resin mass which corresponds to the biasedly thick portion of the shaped resin article) can be uniformly pressed against the second inner wall of the mold cavity. Further, the combined use of the pressurized gas used to form the closed space and the hollow-forming gas is advantageous not only in that the effect of preventing the occurrence of a sink mark is increased, but also in that various problems accompanying the conventional hollow-forming gas injection molding method can be solved as described in items (1) to (2) below.
(1) The occurrence of secondary transfer (a defect in appearance of the shaped resin article, which is caused by the repetition of the contact and separation between the second surface of the molten resin mass and the second inner wall of the mold cavity) after the introduction of the pressurized gas into the mold can be suppressed.
(2) The pressurized gas introduced into a portion of the molten resin mass which corresponds to the thick portion of the shaped resin article is unlikely to intrude into other portions of the molten resin mass, so that a shaped resin article having excellent surface finish can be surely obtained.

With respect to item (2) above, in a conventional hollow-forming gas injection molding method, especially when it is attempted to produce a shaped resin article from a crystalline polymer, a disadvantage is likely to be caused that the pressurized gas introduced into a portion of the molten resin mass which corresponds to the thick portion of the shaped resin article intrudes into other portions of the molten resin mass, thus leading to an occurrence of sink marks. However, when the method of the present invention is combined with the hollow-forming gas injection molding method, the above-mentioned disadvantage accompanying the conventional hollow-forming gas injection molding method does not occur, so that a shaped article having excellent surface finish can be produced even from a crystalline polymer.

In the present invention, it is not necessary that the above-mentioned closed space covers the entire area of the first inner wall of the mold cavity, as long as the second surface of the molten resin mass can be pressed against the second inner wall of the mold cavity with a satisfactory force. This is advantageous especially for producing a shaped resin article having at least one large thickness rib, in which it is necessary to use a mold having a complicated structure [e.g., a mold comprising a plurality of cavity inserts (i.e., separate parts used to form the inner wall of the mold cavity)] which is difficult to seal. For example, in the present invention, the production of a shaped resin article as shown in FIGS. 12, 13(a), 13(b), 13(c), 14, 15, 16 and 17 (detailed description of each of these drawings is made below), which has at least one large thickens rib, can be conducted as follows. In the production of such a shaped resin article, use can be made of a mold having at least one recess ($\alpha$) corresponding to the large thickness rib of the shaped resin article and/or at least one other recess ($\beta$) corresponding to a biasedly thick portion other than the above-mentioned large thickness rib [such as a small thickness rib (support rib)], in which the first inner wall of the mold cavity has an area surrounded by the opening of the above-mentioned recess ($\alpha$) and optionally the opening of the above-mentioned recess ($\beta$) (with respect to such a surrounded area of the first inner wall, reference can be made to FIG. 13(a), in which the portion of the shaped resin article corresponding to the surrounded area of the first inner wall is indicated using reference numeral 25). By using such a mold, the production of the shaped resin article having a large thickness rib can be performed by the method of the present invention, in which the introduction of the pressurized gas is conducted in a manner such that the closed space almost or completely covers the above-mentioned surrounded area of the first inner wall of the mold cavity. In this case, a shaped resin article having at least one large thickness rib can be produced by forming the closed space only on a part of the first inner wall of the mold cavity, without the danger of the occurrence of the escape of the pressurized gas from the mold cavity.

In the present invention, with respect to the mold temperature, although those which are generally employed in the art can generally be used, a suitable temperature is chosen depending on the type of the resin used. However, for surely obtain a shaped resin article which has excellent surface finish and is free of a sink mark on the front surface thereof, it is preferred to employ a mold temperature which is higher than that generally employed in the conventional injection molding methods. Further, with respect to the mold temperature, it is more preferred that the temperature of the first inner wall of the mold cavity satisfies the following formula (I):

$$V-30<T_1<V-15 \quad (I)$$

wherein $T_1$ represents the temperature of the first inner wall of the mold cavity, and V represents the Vicat softening temperature (° C.) of the resin as measured in accordance with ASTM-D1525.

With respect to the resin to be used in the present invention, there is no particular limitation as long as the resin is a thermoplastic resin. Examples of thermoplastic resins include polystyrene (PS); rubber-reinforced styrene polymer resins, such as a high impact polystyrene (HIPS) and a medium impact polystyrene (MIPS); styrene copolymers, such as a styrene/acrylonitrile copolymer (SAN), an acrylonitrile/butyl acrylate rubber/styrene copolymer (AAS), an acrylonitrile/ethylene-propylene rubber/styrene copolymer (AES), an acrylonitrile/chlorinated polyethylene/styrene copolymer (ACS), ABS resins (e.g., an acrylonitrile/butadiene/styrene copolymer, an acrylonitrile/butadiene/styrene/$\alpha$-methylstyrene copolymer and an acrylonitrile/methyl methacrylate/butadiene/styrene copolymer); acrylic resins, such as polymethyl methacrylate (PMMA); polyolefin resins, such as low density polyethylene (LDPE), high density polyethylene (HDPE) and polypropylene (PP); vinyl chloride resins, such as polyvinyl chloride (PVC), polyvinylidene chloride (PVDC), an ethylene/vinyl acetate/vinyl chloride copolymer and an ethylene/vinyl chloride copolymer; polyester resins, such as polyethylene terephthalate (PETP or PET) and polybutylene terephthalate (PBTP or PBT); polycarbonate resins, such as polycarbonate (PC) and a modified polycarbonate; polyamide resins, such as polyamide 66, polyamide 6 and polyamide 46; polyacetal resins (POM), such as a polyoxymethylene copolymer and polyoxymethylene homopolymer; other engineering plastics and super engineering plastics, such as polyether sulfone (PES), polyether imide (PEI), thermoplastic polyimide (TPI), polyether ketone (PEK), polyetherether ketone (PEEK), polyphenylene sulfide (PPS), polyphenylene ether (PPE) and polysulfone (PSU); cellulose derivatives, such as cellulose acetate (CA), cellulose acetate butyrate (CAB), ethyl cellulose (EC); liquid crystal polymers (LCP), such as liquid crystalline polyester and liquid crystalline aromatic polyester; and thermoplastic elastomers, such as thermoplastic-elastomeric polyurethanes (TPU), thermoplastic-elastomeric styrene-butadienes (TSBC), thermoplastic-elastomeric polyolefins (TPO), thermoplastic-elastomeric polyesters (TPEE), thermoplastic-elastomeric polyvinyl chloride (TPVC) and thermoplastic-elastomeric polyamides (TPAE). In the method of the present invention, the above-mentioned thermoplastic polymers can be used individually or in combination.

The resin used in the present invention may contain various types of customary additives, such as plasticizers; stabilizers; ultraviolet absorbers; colorants; mold release agents; fibrous reinforcing agents, such as glass fibers and carbon fibers; and fillers, such as glass beads, calcium carbonate and talc. These additives can be used in such amounts as are usually employed in the art.

With respect to the temperature and pressure conditions for the injection, those which are generally employed in the art for the injection molding of thermoplastic resins can be employed. For example, when the resin is polystyrene, the temperature is generally in the range of from 180 to 220° C., and the pressure is generally in the range of from 50 to 200 MPa.

Hereinbelow, the method of the present invention will be explained in detail, with reference to the drawings.

FIG. 1 is a diagrammatic cross-sectional view of one form of a mold to be used in the present invention. As shown in FIG. 1, mold 1 comprises fixed mold half 1a and movable mold half 1b mating with the fixed mold half to thereby provide mold cavity 2 defined by an inner wall of fixed mold half 1a and an inner wall of movable mold half 1b. Mold cavity 2 has opposite, first and second inner walls 2b and 2a, and communicates with a resin inlet (sprue 4 and gate 5) and with a gas inlet (gas introduction line 10 and gas introduction pin 8). Mold 1 has gas-release passage 3 which has an inner opening in second inner wall 2a of mold cavity 2 and communicates with the outside of the mold. Gas-release passage 3 is a slit formed along the mating surface of mold 1, and the slit has, in a cross-section thereof, an appropriate thickness (width) at least in the vicinity of the inner opening thereof, which thickness is suitable for allowing a gas present in mold cavity 2 to be released to the outside of mold 1 (together with any gas emitted from an injected molten resin), without permitting an intrusion of the molten resin into gas-release passage 3. The appropriate thickness of the slit, as viewed in a cross-section thereof, varies depending on the type of the resin to be used or the conditions for the injection molding; however, it is generally preferred that the thickness of the slit is in the range of from 1/200 mm to 1/10 mm, more preferably from 1/100 mm to 1/10 mm, still more preferably from 3/100 to 7/100 mm.

In mold 1, each ejector pin 6 is disposed in a hole formed in movable mold half 1b and has its forward end exposed to mold cavity 2 in first inner wall 2b. A gap between each ejector pin 6 and the wall surface of the hole having the ejector pin disposed therein is sealed by means of an O-ring 7a to prevent a gas from leakage out of mold 1 through the gap around each ejector pin 6 when the gas is introduced into mold cavity 2. This construction of mold 1 allows first inner wall 2b of mold cavity 2 to form a molten resin/first inner wall interface together with the first surface of a molten resin, the interface being expandable by a pressurized gas to form a closed space filled with the pressurized gas.

Each gas introduction pin 8 is disposed in a hole formed in movable mold half 1b and has its forward end exposed to mold cavity 2 in first inner wall 2b. Each gas introduction pin 8 is intended to allow gas introduction line 10 to communicate with mold cavity 2 through a gap between gas introduction pin 8 and the wall surface of the hole having gas introduction pin 8 disposed therein. Gas introduction line 10 leads to a source (not shown) for a pressurized gas through gas valve 9a. Thus, a pressurized gas can be led through gas valve 9a, gas introduction line 10 and the gap around each gas introduction pin 8 disposed in a hole, into mold cavity 2. Each O-ring 7b is provided for preventing an escape of the supplied, pressurized gas to be introduced into mold cavity 2.

Mold 1 indicated in FIG. 1 is adapted for use in producing a box-shaped resin article having ribs on a back surface thereof. The inner edge of the mating surface of mold 1 of FIG. 1 is positioned along a line corresponding to the circumferential edge of a bottom surface of the box-shaped resin article to be produced. The inner end of gas-release passage 3 opens at a portion of second inner wall 2a corresponding to a position in the circumferential edge of the bottom surface of the box-shaped resin article to be produced. The position of the inner end (opening) of gas-release passage 3 is not limited to that shown in FIG. 1, and other various positions may be selected, such as those indicated in FIG. 2 and FIG. 3, depending on the position of the mating surface of mold 1.

Figure 2:
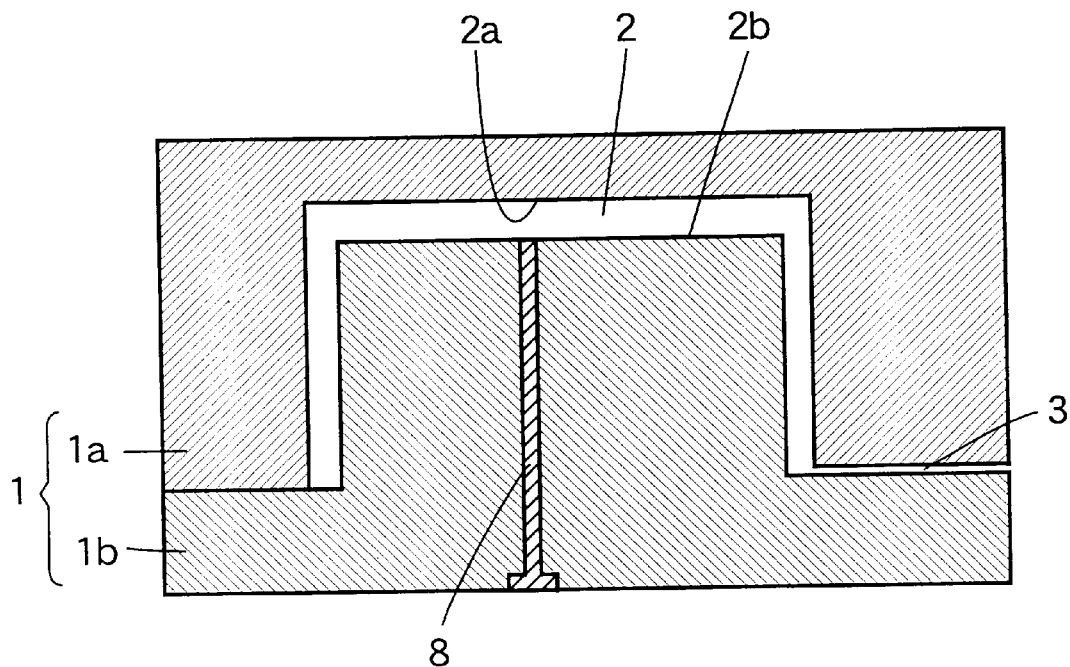
FIG. 2 is a diagrammatic view of another example of a gas-release passage.

FIG. 2 is a diagrammatic view of another example of gas-release passage 3. The inner edge of the mating surface of mold 1 of FIG. 2 extends along a line corresponding to the top edge of the side wall of a box-shaped resin article to be produced. In FIG. 2, gas-release passage 3 has its inner opening at a peripheral portion of second inner wall 2a which corresponds to the top edge of the side wall of the box-shaped resin article to be produced. In FIG. 2, gas introduction pin 8 for introducing a pressurized gas into mold cavity 2 is disposed in a hole formed in movable mold half 1b and has its forward end exposed to mold cavity 2 in first inner wall 2b thereof, in the same manner as in FIG. 1.

Figure 3:
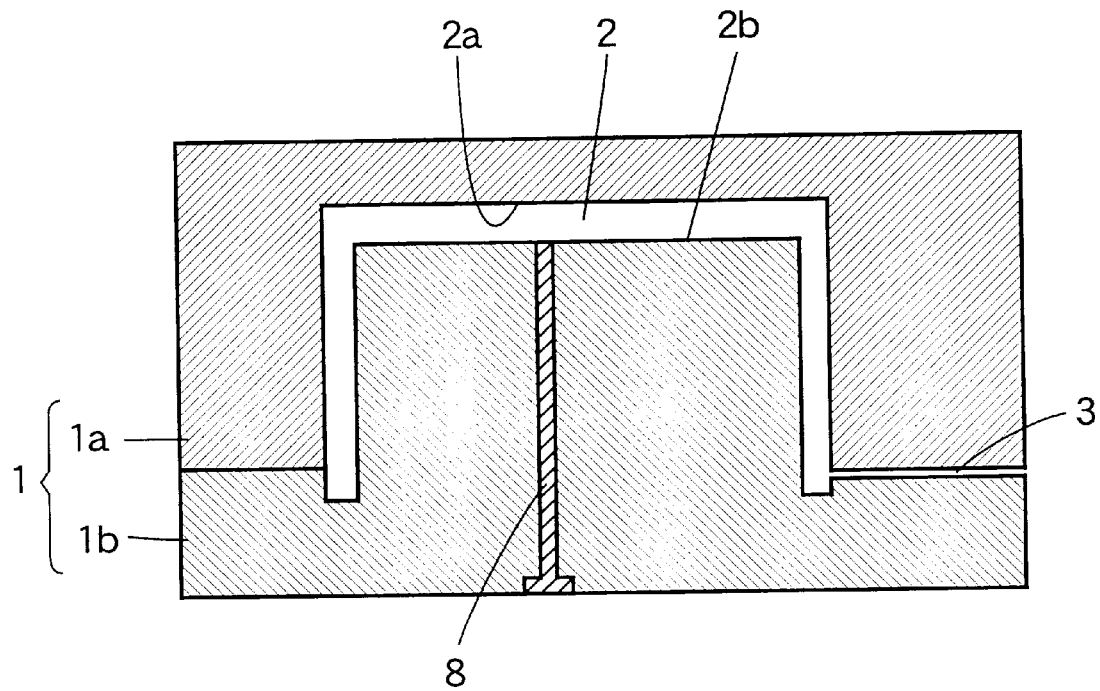
FIG. 3 is a diagrammatic view of still another example of a gas-release passage.

FIG. 3 is a diagrammatic view of still another example of gas-release passage 3. The inner edge of the mating surface of mold 1 of FIG. 3 extends along a line corresponding to an intermediate, peripheral line of the height of the side wall of a box-shaped resin article to be produced. In FIG. 3, gas-release passage 3 has its inner opening at a portion of second inner wall 2a which corresponds to an intermediate, peripheral line of the height of the side wall of the box-shaped resin article to be produced. In FIG. 3, gas introduction pin 8 for introducing a pressurized gas into mold cavity 2 is disposed in a hole formed in movable mold half 1b and has its forward end exposed to mold cavity 2 in first inner wall 2b thereof, in the same manner as in FIG. 1.

The method of the present invention will be explained in more detail with reference to FIG. 1.

In step (2) of the method of the present invention, a resin is injected in a molten form, under preselected temperature and pressure conditions for the injection, into mold cavity 2 of mold 1 through sprue 4 and gate 5 in an amount larger than the above-mentioned weight (VW) of the molten resin having a resin volume equal to the volume of the mold cavity. That is, an excess filling of the mold cavity is effected with the molten resin to form a molten resin mass having opposite, first and second surfaces respectively facing first and second inner walls 2b and 2a of the mold cavity, while allowing a gas present in mold cavity 2 to be released to the outside of mold cavity 2 through gas-release passage 3, together with any gas emitted from the injected molten resin. By virtue of the presence of gas-release passage 3 of mold 1, entrapment of a gas (gas bubbles) into a portion between the second surface of the molten resin mass and second inner wall 2a of mold cavity 2 can be prevented. For facilitating the prevention of the gas entrapment, it is preferred that the inner opening of gas-release passage 3 is positioned near an end portion of mold cavity 2 which is remote from gate 5 of mold cavity 2, as shown in FIG. 1. The first surface of the molten resin mass and first inner wall 2b of mold cavity 2 form a molten resin/first inner wall interface therebetween.

After completion of step (2), in step (3), valve 9a is opened to thereby allow a pressurized gas from a source (not shown) for the pressured gas to flow through gas introduction line 10 and then a gap between each gas introduction pin 8 and the wall surface of a hole having gas introduction pin 8 disposed therein. In this way, the pressurized gas is introduced into mold cavity 2 on a side of the first surface of the molten resin mass to expand the molten resin/first inner wall interface, thereby forming a closed space which is filled with the pressurized gas and separated from gas-release passage 3 through the molten resin mass, so that the pressurized gas filled in the closed space urges the second surface of the molten resin mass to be pressed against second inner wall 2a of mold cavity 2. The first and second surfaces of the molten resin mass, respectively, correspond to back and front surfaces of a shaped resin article to be injection molded.

Step (3) can be conducted immediately after completion of step (2). Alternatively, there may be an appropriate time lag between step (2) and step (3) as long as step (3) is conducted before the molten resin mass solidifies.

Examples of gases usable in the present invention include a substance which is gaseous at room temperature, such as nitrogen, air, carbon dioxide and argon. An inert gas, such as nitrogen, is preferred. The appropriate pressure of the pressurized gas varies depending on factors, such as the type of a resin used, and the shape and size of a shaped article to be produced. However, the pressure of the gas is generally in the range of from 12.5 to 312.5 MPa, preferably from 50 to 250 MPa.

Figure 8:
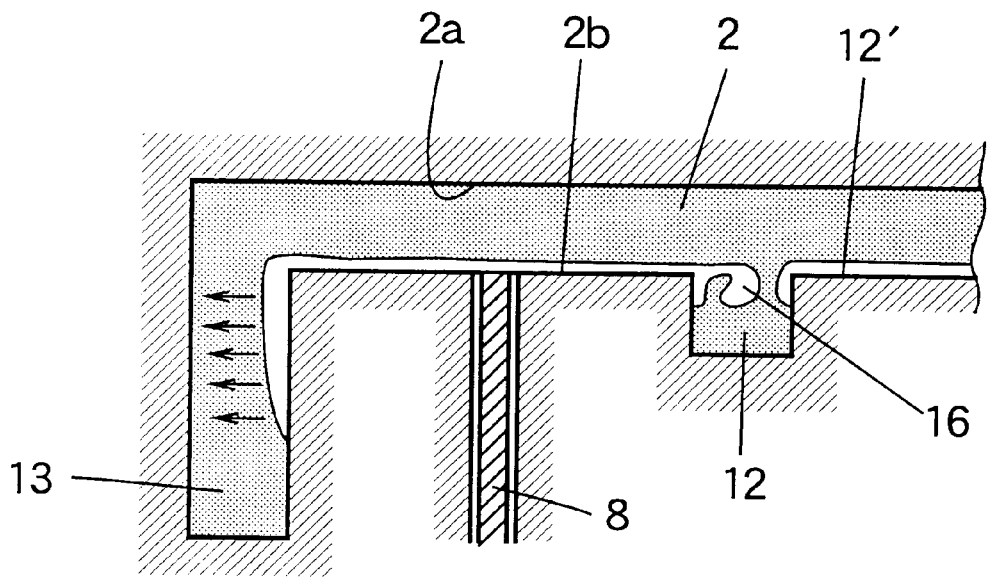
FIG. 8 is a diagrammatic view showing another example as to how a pressurized gas urges the second surface of a molten resin mass to be pressed against the second inner wall of the mold cavity in the method of the present invention, wherein a part of the pressurized gas intrudes into the molten resin mass to form a hollow at a thick portion.

In step (3) of the method of the present invention, a closed space which is filled with the pressurized gas and separated from gas-release passage 3 through the molten resin mass is formed between the first surface of the molten resin mass and first inner wall 2b of mold cavity 2. By the action of the pressurized gas filled in the closed space, the second surface of the molten resin mass is pressed against second inner wall 2a of mold cavity 2. As a result, upon cooling to solidify the molten resin mass, there can be obtained a shaped article having an improved surface finish, i.e., a shaped article which exhibits excellent gloss and luster and an excellent reproduction of the configuration of cavity inner wall 2a and which is free of sink marks. Further, the pressurized gas effectively separates a wide area of the first surface of the molten resin mass from first inner wall 2b of mold cavity 2, so that improved mold release is achieved. (Illustratively, as shown in FIGS. 5, 8 and 11, the pressurized gas intrudes between first inner wall 2b and the lowermost area of portion 12 of the molten resin mass corresponding to a rib.)

Figure 4:
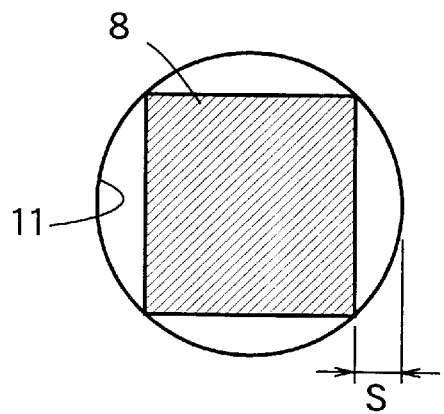
Figure 4:
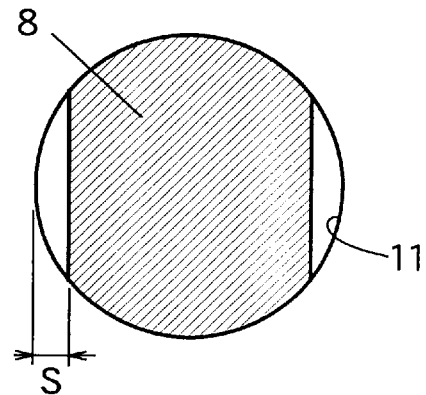

Generally, a gap (space) is necessarily formed between gas introduction pin 8 and the inner wall of a hole having gas introduction pin 8 disposed therein, so that a pressurized gas can freely pass through the space. Therefore, there is no need for providing a further space (gap) there. However, as shown in FIG. 4(a) and FIG. 4(b), by employing hole 11 having a circular cross-section and by employing a gas introduction pin 8 having a non-circular cross-section, a more ample space can be provided for the pressurized gas to flow more smoothly. In FIG. 4(a) and FIG. 4(b), numeral 11 designates a hole provided in movable mold half 1b, and character S designates a space formed by cutting the surface of a gas introduction pin 8 so as to give it a non-circular cross-section. It is desired that at least in the vicinity of the forward end of gas introduction pin 8, space S has a size which does not permit the molten resin to intrude thereinto, but permits only the pressurized gas to flow smoothly therethrough. The appropriate size of space S varies, depending on the internal configuration of the mold cavity of the mold, the position of gas introduction pin 8, the material for gas introduction pin 8, the molding conditions or the like. However, generally, it is preferred that the size of space S is in the range of from $1/200$ mm to $1/5$ mm, more preferably from $1/100$ mm to $1/10$ mm, still more preferably around $1/20$ mm. It is also preferred that, at a portion of gas introduction pin 8 other than the forward end portion thereof, the size of space S is larger than the above-mentioned preferred range, thereby facilitating the flow of the gas.

Figure 5:
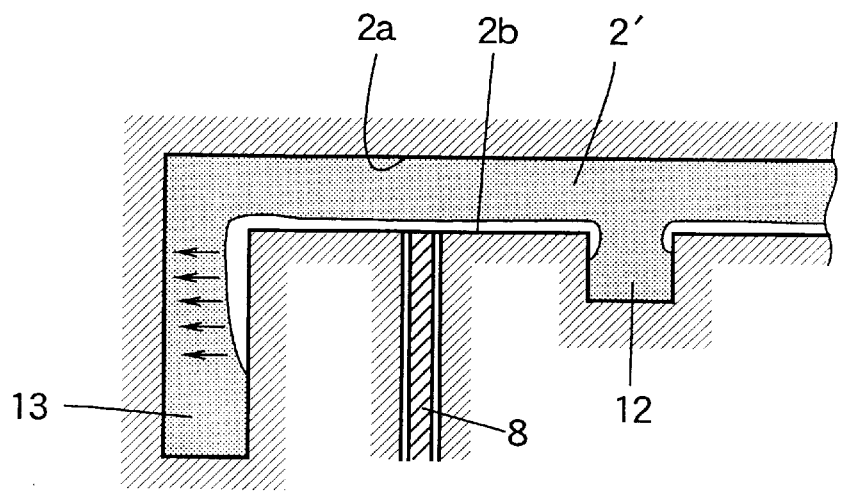
FIG. 5 is a diagrammatic view showing an example as to how a pressurized gas urges the second surface of a molten resin mass to be pressed against the second inner wall of the mold cavity in the method of the present invention.

FIG. 5 is a diagrammatic view showing an example as to how a pressurized gas urges the second surface of molten resin mass 2' to be pressed against second inner wall 2a of the mold cavity in the method of the present invention. FIG. 5 also diagrammatically shows the state of portion 12 of molten resin mass 2' which corresponds to a rib of a shaped resin article and the state of portion 13 of molten resin mass 2' which corresponds to a side wall of a shaped resin article to be produced. The pressurized gas introduced into the mold cavity through the space between the inner wall of hole 11 and gas introduction pin 8 expands the molten resin/first inner wall interface, thereby forming a closed space which is filled with the pressurized gas, and the pressurized gas urges the second surface of molten resin mass 2' to be pressed against second inner wall 2a of the mold cavity. The pressurized gas reaches both sides of the base portion of portion 12 of molten resin mass 2' which poriton 12 corresponds to a rib of a shaped resin article, so that the second surface of molten resin mass 2' is surely pressed against second inner wall 2a of the mold cavity, thereby enabling the production of a shaped resin article having an improved surface finish, which is free of sink marks. (By contrast, in the conventional injection molding methods, the occurrence of a sink mark at a portion of a front surface of a shaped resin article opposite to a rib cannot be prevented.)

On the other hand, the pressurized gas also reaches portion 13 of molten resin mass 2' which corresponds to a side wall of a shaped resin article, so that the second surface of molten resin mass 2' corresponding to the front surface of a side wall of a shaped resin article is pressed against second inner wall 2a of the mold cavity, as indicated by arrows in FIG. 5.

In general, it is expected that the higher the pressure of the pressurized gas, the more likely it is that a leakage of the pressurized gas occurs. However, in the method of the present invention, the higher the pressure of the pressurized gas, the more strongly the second surface side of portion 13 of molten resin mass 2' is pressed against second inner wall 2a of the mold cavity, so that the pressurized gas is surely prevented from intruding into the second surface side of molten resin mass 2'. This effect of the prevention of gas intrusion into the second surface side of molten resin mass 2' can be achieved only when both the gas-release passage requirement and the excess filling requirement of the present invention are satisfied. When any one of the gas-release passage requirement and the excess filling requirement of the present invention is not satisfied, a pressurized gas which is introduced into the mold cavity on a side of the first surface of molten resin mass 2' easily intrudes into the second surface side of molten resin mass 2', thus disadvantageously forming a gas-leak path on the surface of molten resin mass 2', which gas-leak path can lead the gas from the first surface side of molten resin mass 2' into the second surface side of molten resin mass 2'. When such a gas-leak path is formed on the first and second surfaces of molten resin mass 2', it becomes difficult to form a closed space which is filled with the pressurized gas and separated from the gas-release passage. When a mold having a mating surface such as shown in FIG. 2 is used in the conventional injection molding methods, a leakage of the pressurized gas to the outside of the mold is likely to occur. However, in the present invention, by satisfying both the requirement that use be made of a mold having a specific structure in which a gas-release passage is formed in association with the mold cavity and with a mating surface of the mold and the requirement that an excess filling of the mold cavity with a molten resin mass be performed, a leakage of the pressurized gas to the outside of the mold can be satisfactorily prevented. In the present invention, from the viewpoint of increasing the gas-sealing effect of the injected molten resin, it is desired that the molten resin/first inner wall interface to be expanded by a pressurized gas for forming a closed space is formed so as to be fully surrounded by a molten resin mass which is intended to form a protruded portion, i.e., at least one biasedly thick portion (such as a rib or a boss) of a shaped resin article, or at least one side wall of a shaped resin article, or a combination of at least one biasedly thick portion and at least one side wall. In addition, for further increasing the gas-sealing effect of the injected molten resin, it is preferred that the above-mentioned protruded portion of a shaped resin article has configuration characteristics such that it has a height of 3 mm or more, more preferably 7 mm or more, still more preferably 10 mm or more, and that it has a side surface which extends, on a side of the molten resin/first inner wall interface, at an angle of from 45 to 90°, more preferably from 80 to 90°, still more preferably from 88 to 89.5°, relative to a plane parallel to a surface portion of the shaped resin article from which surface portion the side surface of the protruded portion arises.

A molten resin mass shrinks upon cooling. Therefore, depending on the internal morphology of the mold cavity, it is possible that a leakage of the pressurized gas occurs due to a shrinkage of the molten resin mass upon cooling. For avoiding the above possibility, it is preferred that, after the injection of the molten resin in step (2), a predetermined holding pressure is applied to the injected molten resin so as to compensate the decrease in the volume of the molten resin mass upon cooling. The holding pressure is generally 100 MPa or less, preferably in the range of from 5 to 40 MPa. When a holding pressure in the above-mentioned range is applied, the danger of the occurrence of a leakage of the pressurized gas due to a cooling shrinkage of the molten resin mass can be avoided without the occurrence of burrs. Further, as described above, by the application of the holding pressure to the injected molten resin, it becomes possible to prevent the occurrence of a decrease in the size and mechanical strength of a biasedly thick portion (such as a rib or a boss) of a shaped resin article to be produced. Therefore, by employing the application of the holding pressure, the freedom in designing a shaped resin article to be produced is increased.

It is not necessary that the pressurized gas is introduced from a side of a movable mold half. The pressurized gas may also be introduced from a side of a fixed mold half. Whether the pressurized gas is introduced from a side of a fixed mold half or a side of a movable mold half depends on the positional relationships between the first and second inner walls of the mold cavity and the fixed and movable mold halves of the mold. Generally, when second inner wall $2a$ of mold cavity 2 is present on a side of fixed mold half $1a$ as shown in FIG. 1, it is preferred that the pressurized gas is introduced from a side of movable mold half $1b$ as shown in FIG. 1. On the other hand, when a second inner wall of a mold cavity is present on a side of a movable mold half, it is preferred that the pressurized gas is introduced from a side of a fixed mold half.

After introduction of a pressurized gas, the molten resin mass is allowed to cool to solidify the molten resin mass. Subsequently, after discharging the. pressurized gas from mold cavity 2, mold 1 is opened, and the obtained shaped resin article is ejected from movable mold half $1b$ by means of ejector pins 8.

Figure 6:
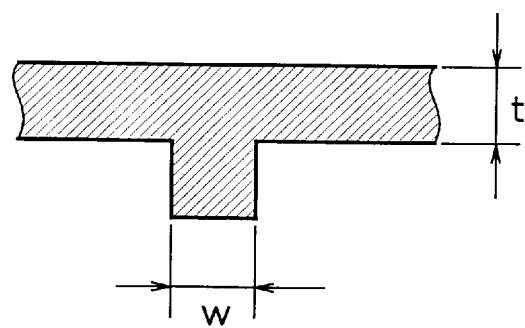
FIG. 6 is an explanatory cross-sectional view of one form of the biasedly thick portion of a shaped resin article produced by the method of the present invention.

The method of the present invention is especially useful in producing a shaped resin article having, on a back surface thereof, a locally protruded portion at which the shaped resin article has an increased thickness (i.e., protruded portions, such as rib, boss, and a combination thereof). Specifically, the method of the present invention is especially effective for producing a shaped resin article in which the wall thickness (indicated by character $\underline{t}$ in FIG. 6) and the width of a local protrusion (indicated by character $\underline{w}$ in FIG. 6) have the following relationship:

$$w \geq (\tfrac{3}{5})t$$

When a shaped resin article satisfying the above formula is produced by the conventional injection molding methods, it is very likely that the shaped resin article has sink marks at a portion of a front surface of the shaped resin article which is opposite to the local protrusion on a back surface thereof. By contrast, in the method of the present invention, the occurrence of such sink marks can be surely prevented.

Figure 7:
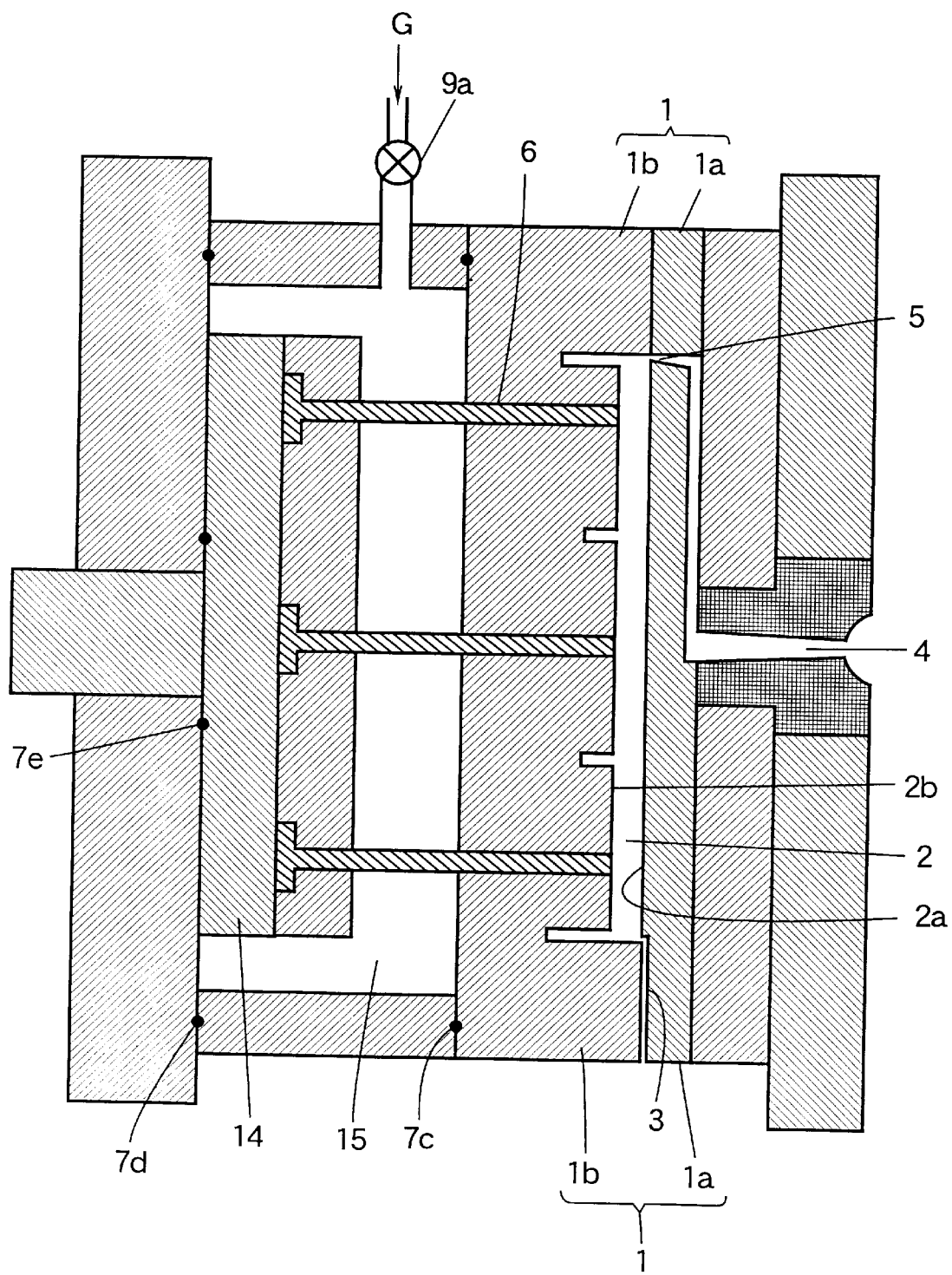
FIG. 7 is a diagrammatic cross-sectional view of another form of a mold to be used in the method of the present invention.

FIG. 7 is a diagrammatic cross-sectional view of another form of a mold to be used in the method of the present invention. The mold shown in FIG. 7 is different from the mold shown in FIG. 1 in that, in the mold of FIG. 7, gas introduction pin 8 is not employed, and a pressurized gas is adapted to be introduced into mold cavity 2 through the space between each ejector pin 6 and the inner wall of the hole having ejector pin 6 disposed therein. With respect to mold 1 of FIG. 7, on the rear side of movable mold half $1b$, remote from mold cavity 2, there is provided a sealed chamber 15 which contains the rear end portion of each ejector pin 6 and ejector pin-supporting plate 14. Sealed chamber 15 is connected to a source (not shown) for a pressurized gas through gas valve $9a$. The pressurized gas supplied from the gas source is introduced into mold cavity 2 through sealed chamber 15, and the space between each ejector pin 6 and the inner wall of the hole having ejector pin 6 disposed therein. In the case of mold 1 of FIG. 7 having the above-described structure, there is no need for providing seal means (such as O-rings) in association with each ejector pin 6. In addition, when movable mold half $1b$ has a non-integral structure in which, for example, a separable, exchangeable "cavity insert" member having its forward and rear ends exposed, respectively, to mold cavity 2 and sealed chamber 15 is provided in movable mold half 1b, there is no need to gas-tightly seal the joints between the cavity insert and the remaining integral portion of movable mold half 1b.

FIG. 8 is a diagrammatic view showing an another example as to how a pressurized gas urges the second surface of a molten resin mass to be pressed against the second inner wall of the mold cavity in the method of the present invention, wherein a part of the pressurized gas intrudes into the molten resin mass to form a hollow at a thick portion. In this instance, the pressurized gas introduced into the mold cavity through a gap between the surface of gas introduction pin 8 and the wall surface of a hole having pin 8 disposed therein spreads along first inner wall 2b and causes the interface between the molten resin and first inner wall 2b (molten resin/first inner wall interface) to be expanded, thereby urging the second surface of the molten resin mass to be pressed against second inner wall 2a of the mold cavity. Then, a part of the pressurized gas arrives at a base portion of molten resin section 12 which corresponds to a rib of a shaped resin article to be produced so that a portion of the second surface of the molten resin mass, which is positioned opposite to molten resin section 12, is pressed against second inner wall 2a, thereby preventing the occurrence of a sink mark at a portion of the front surface of the shaped resin article (which corresponds to the second surface of the molten resin mass) which is positioned opposite to the rib of the shaped resin article (which corresponds to molten resin section 12), which portion of the front surface is likely to suffer from the occurrence of a sink mark in conventional molding methods. Further, a part of the pressurized gas which has arrived at the base portion of the molten resin section 12 intrudes into molten resin section 12 at a certain position of the base portion of molten resin section 12 to form hollow 16, thereby increasing the sink mark-preventing effect. [At the cross-section of the molten resin section 12 shown in FIG. 8, which section corresponds to the biasedly thick portion of a shaped article to be produced, the closed space filled with the gas extends to a middle of the base portion of molten resin section 12 to form hollow 16 in molten resin section 12. The formed hollow extends in molten resin section 12 along a line perpendicularly traversing a plane of the drawing containing of FIG. 8. Accordingly, at a certain cross-section taken at a portion other than that shown in FIG. 8, hollow 16 may have a substantially circular cross-section as shown in FIG. 9(a).] This sink-mark preventing effect by the formation of hollow 16 is achieved also by the technique of a conventional internal gas injection molding method (hollow-forming gas injection molding method).

However, in the injection molding method of the present invention, in addition to hollow 16, the closed space filled with the pressurized gas is also formed in the mold cavity at positions around the base portion of molten resin section 12, so that the second surface of the molten resin mass is pressed against second inner wall 2a not only at a portion of second inner wall 2a which is positioned just opposite to the molten resin section 12 but also at a portion of second inner wall 2a which is positioned around the above-mentioned portion just opposite to the molten resin section 12. Therefore, by the method of the present invention, it is possible to produce a shaped resin article having a rib without suffering from the occurrence of non-uniformity in the gloss and luster on the front surface of the shaped resin article, which is a problem accompanying the conventional internal gas injection molding.

FIG. 9(a) is a diagrammatic cross-sectional view of one form of the biasedly thick portion of a shaped resin article produced by the method of the present invention, showing that a hollow is formed within the thick portion; and FIG. 9(b) is a diagrammatic cross-sectional view of one form of the biasedly thick portion of a shaped resin article produced by the conventional internal gas injection molding method, showing that a hollow formed in the thick portion invades into other portions. As already mentioned above, in the conventional internal gas injection molding method, the pressurized gas introduced into a portion of the molten resin mass which corresponds to the thick portion of the shaped resin article is likely to intrude into other portions of the molten resin mass as illustratively shown in FIG. 9(b). Such an invasion of the pressurized gas into undesired portions of the molten resin mass can be suppressed depending on the pressure of the pressurized gas, and depending on the shape and size of the thick portion. However, especially when it is attempted to produce a shaped resin article from a crystalline resin or when a highly pressurized gas is employed, it has been difficult to prevent the occurrence of the above-mentioned intrusion of the pressurized gas. On the other hand, in the injection molding method of the present invention, such an intrusion of the pressurized gas is unlikely to occur.

FIG. 10 is a diagrammatic cross-sectional view of a further form of a mold to be used in the method of the present invention. This mold can be used to produce a shaped resin article by employing, in combination, the method of the present invention and the conventional hollow-forming gas injection molding method. In the mold shown in FIG. 10, gas introduction hollow needle segment 17 is provided in fixed mold half 1a and the end portion of gas introduction hollow needle segment 17 is connected to an opening formed on the inner wall of the runner. From a supply source for a pressurized gas (not shown), a pressurized gas to be used as a hollow-forming gas is introduced into a molten resin in a runner through gas valve 9b, gas introduction line 10b and gas introduction hollow needle 17 so that a molten resin mass having a hollow formed therein is obtained in the mold cavity.

FIG. 11 is a diagrammatic view showing a further example as to how a pressurized gas urges the second surface of a molten resin mass to be pressed against second inner wall 2a of the mold cavity of mold 1 having the same construction as shown in FIG. 10, wherein a part of the pressurized gas intrudes into the molten resin mass to form a hollow. In this instance, the pressurized gas introduced into the mold cavity through a gap between the surface of gas introduction pin 8 and the wall surface of a hole having pin 8 disposed therein spreads along first inner wall 2b and causes the interface between the molten resin and first inner wall 2b to be expanded, thereby urging the second surface of the molten resin mass to be pressed against second inner wall 2a of the mold cavity. Then, a part of the pressurized gas arrives at a base portion of molten resin section 12 (which section corresponds to a rib of a shaped resin article to be produced) so that a portion of the second surface of the molten resin mass (which portion is positioned opposite to molten resin section 12) is pressed against second inner wall 2a, thereby preventing the occurrence of a sink mark at a portion of the front surface of the shaped resin article which portion is positioned opposite to the rib of the shaped resin article (which rib corresponds to molten resin section 12). Such a portion of the front surface of the shaped article is likely to suffer from the occurrence of a sink mark in the conventional molding methods. Further, a pressurized gas as a hollow-forming gas introduced into the molten resin through the gas introduction hollow needle segment 17 shown in FIG. 10 forms hollow 18 in molten resin section 12 at a portion thereof which portion corresponds to the rib of a shaped resin article to be produced, thereby increasing the sink mark-preventing effect. This sink-mark preventing effect by the formation of hollow 18 is achieved also by the technique of the conventional internal gas injection molding method (hollow-forming gas injection molding method). However, in the injection molding method of the present invention, in addition to hollow 18, the closed space filled with the pressurized gas is also formed in the mold cavity at positions around the base portion of molten resin section 12 (including a position designated as 12'), so that the second surface of the molten resin mass is pressed against second inner wall 2a not only at a portion of second inner wall 2a which is positioned just opposite to the molten resin section 12 but also at portions of second inner wall 2a which are positioned around the above-mentioned portion just opposite to the molten resin section 12. Therefore, by the method of the present invention, it is possible to produce a shaped resin article having a rib without suffering from the occurrence of non-uniformity in the gloss and luster on the front surface of the shaped resin article, which is a problem accompanying the conventional internal gas injection molding. As in the case of the molding conducted in a manner as shown in FIG. 8, when a molding is conducted by employing in combination the present invention and the hollow-forming injection molding method, in which a mold having the same construction as shown in FIG. 10 is used, the intrusion of the pressurized gas into undesired portions of the molten resin mass is unlikely to occur, differing from the molding by using a conventional hollow-gas injection molding method alone.

Figure 12:
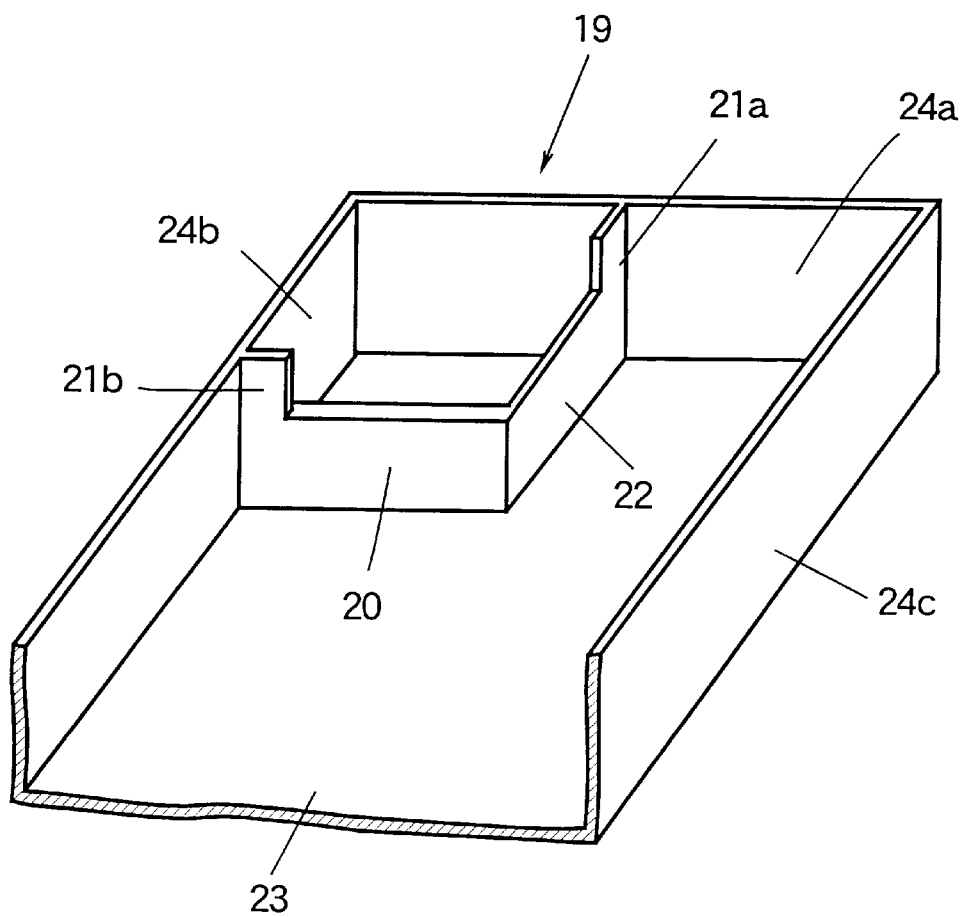
FIG. 12 is a diagrammatic, partly cut-away, perspective view of another form of a shaped resin article produced by the method of the present invention.

FIG. 12 is a diagrammatic, partly cut-away, perspective view of another form of a shaped resin article produced by the method of the present invention. As already mentioned above, the shaped resin article as shown in FIG. 12 can be advantageously produced by the method of the present invention, in which an expanded, molten resin/first inner wall interface is formed only on a part of the first inner wall of the mold cavity, without the occurrence of a sink mark and the occurrence of the escape of the pressurized gas from the mold cavity. Specifically, the shaped resin article of FIG. 12 can be produced by the method of the present invention using a mold as shown in FIG. 1, in which the expanded, molten resin/first inner wall interface is formed only on a part of the first inner wall of the mold cavity which corresponds to a region designated as 25 in FIG. 13(a) (which is a horizontal cross-sectional view of the shaped resin article of FIG. 12). Shaped resin article 19 shown in FIG. 12 comprises: bottom wall 23; side walls 24a to 24c and 24d (not shown); rib 20 (a rib having a large thickness) having height-supplement rib 21b; and rib 22 (support rib) having height-supplement rib 21a, wherein rib 22 and 20 form T-shaped intersections with side walls 24a and 24b, respectively. Shaped resin article 19 can be produced using a mold having recesses corresponding to side walls 24a to 24c, rib 20 having height-supplement rib 21b and rib 22 having height-supplement rib 21a, which recesses cooperate to form the above-mentioned surrounded area [corresponding to region 25 shown in FIG. 13(a)] on the first inner wall of the mold cavity, on which the expanded, molten resin/first inner wall interface is formed during the injection molding operation. Each of a portion of the recess for rib 20 which corresponds to height-supplement rib 21b and a portion of the recess for rib 22 which corresponds to height-supplement rib 21a functions to prevent the pressurized gas (introduced into the mold cavity to form the closed space on the above-mentioned surrounded area of the first inner wall surface) from intruding into an undesired portion of the molten resin mass, which undesired portion is positioned outside the above-mentioned surrounded area (corresponding to region 25).

FIG. 13(a) is a diagrammatic bottom view of shaped resin article 19 of FIG. 12; FIG. 13(b) is a diagrammatic cross-sectional view of shaped resin article 19 of FIG. 13(a), taken along the line XIII—XIII; and FIG. 13(c) is a diagrammatic cross-sectional view of shaped resin article 19 of FIG. 13(a), taken along the line XIII'—XIII'. In FIG. 13(a), the portion designated as 26 is a portion of shaped resin article 19, which corresponds to a gas inlet for the pressurized gas.

Figure 13:
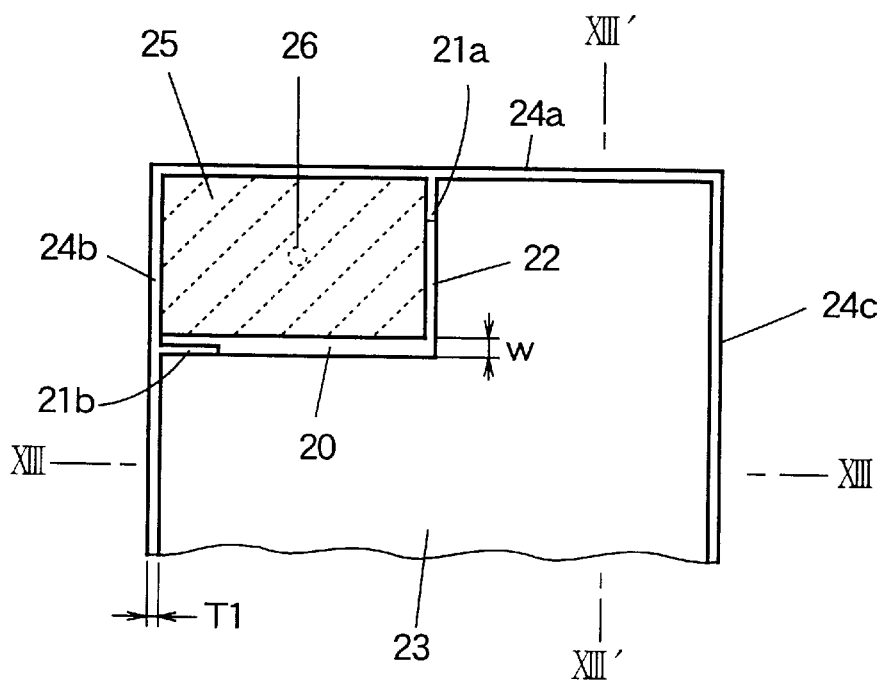
Figure 13:
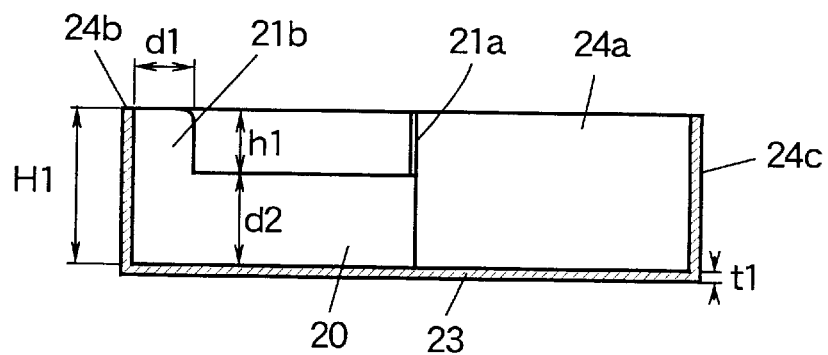
Figure 13:
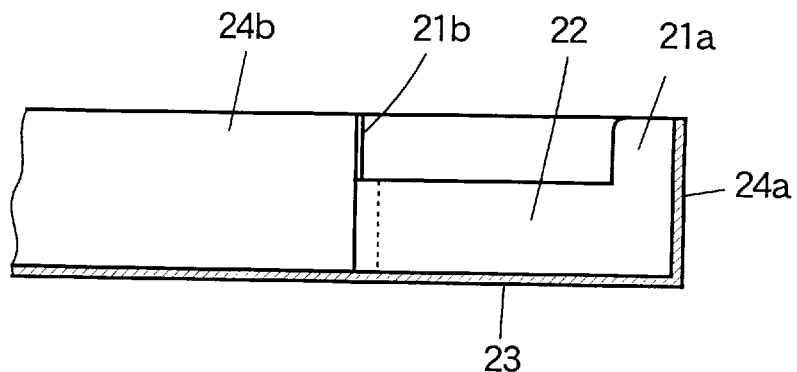

In the method of the present invention, when a shaped resin article to be produced has a structure as shown in FIG. 12 and FIG. 13 (a), in which a wall-surrounded region 25, wherein the wall is composed of a plurality of protruded portions (respective parts of side walls 24a and 24b of shaped resin article 19 and ribs 20 and 22), is formed on the back side of shaped resin article 19. That is, region 25 is surrounded by a part of side wall 24a, a part of side wall 24b, rib 20 and rib 22. This region 25 corresponds to an expanded, molten resin/first inner wall interface which was once formed during the injection molding operation according to the method of the present invention. As shown in FIG. 12 and FIG. 13(a), ribs 22 and 20 form T-shaped intersections with side walls 24a and 24b, respectively. In this instance, as shown also in FIG. 12 and FIG. 13 (a), in shaped resin article 19 of FIG. 12, side walls 24a and 24b (which surround region 25 together with ribs 20 and 22) extend to the outside of region 25, wherein ribs 22 and 20, respectively, have height-supplement ribs 21a and 21b at their T-shaped intersections with side walls 24a and 24b so that ribs 22 and 20 have substantially equivalent heights to side walls 24a and 24b. In the present invention, the term "substantially equivalent height" means that the difference in height is 0 to 10%. Illustratively stated with reference to FIG. 13(b), it is preferred that the height (indicated by H1) of side walls 24a, 24b and 24c, the height (indicated by d2) of rib 20 (having a large thickness) and of rib 22 (support rib), and the height (indicated by h1) of height-supplement ribs 21a and 21b satisfy the following relationship:

$$h1+d2 \geq 0.9 \times H1.$$

The shaped resin article of FIG. 12 is a more preferred example of a shaped resin article, wherein h1+d2=H1.

With respect to the production of a shaped resin article having the above-mentioned T-shaped intersections, when the two intersections (intersection of side wall 24a with support rib 22, and intersection of side wall 24b with rib 20) have substantially equivalent heights to each other, it can be more surely achieved to prevent a leakage of the pressurized gas from a closed space formed by expanding a molten resin/first inner wall interface corresponding to region 25 of shaped resin article 19.

The above-mentioned T-shaped intersection may have a configuration such that the intersection has an oblique angle.

Figure 14:
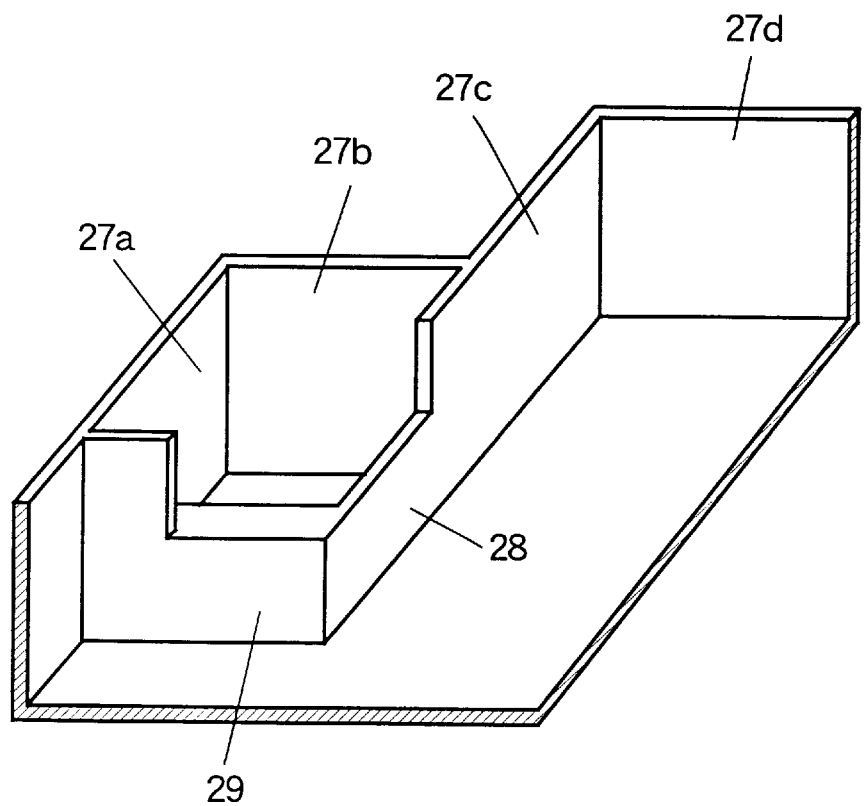
FIG. 14 is a diagrammatic, partly cut-away, perspective view of still another form of a shaped resin article produced by the method of the present invention.

Further, the T-shaped intersection may also have a configuration such that, as shown in FIG. 14, side walls 27b and 27c which are of the same height are connected to each other to form an intersection and that rib 28 (having a smaller height than side walls 27b and 27c and having a height-supplement rib thereon for removing the height difference between rib 28 and side walls 27b and 27c) is connected to the intersection between side walls 27b and 27c to thereby form a T-shaped intersection.

In the above-mentioned examples of T-shaped intersections, the height difference between different intersecting portions is removed or alleviated by using a height-supplement rib (rib 21a or 21b). The removal or alleviation of the height difference in the T-shaped intersection is not necessarily performed by forming a height-supplement rib, but may also be performed by reducing the height of a higher intersecting portion. Further, with respect to the top surface of the T-shaped intersection, it is not necessary that the top surface extends along a plane parallel to the back surface of the shaped resin article, and it is also not necessary that the top surface of the T-shaped intersection straightly extends. That is, the top surface of the T-shaped intersection may extend along a plane which is not parallel to the back surface of the shaped resin article, or may extend along a curved line.

Referring to FIG. 13(b), in a shaped resin article produced by the method of the present invention, it is preferred that the width (indicated by d1) of height-supplement ribs 21a and 21b and the height (indicated by d2) of support rib 22 have the following relationships with the thickness (indicated by T1) of side wall sections 24a to 24c and the thickness (indicated by t1) of bottom wall 23.

d1>2T1, and d2>2t1.

It is more preferred that the following relationships are satisfied.

d1>3T1, and d2>3t1.

With respect to the thickness of support rib 22, which is provided so as to form region 25 of a shaped resin article corresponding to a molten resin/first inner wall interface, there is no particular limitation as long as the thickness of support rib 22 is smaller than the thickness of large thickness rib 20. However, when there is no need for increasing the strength of support rib 22, it is preferred that the thickness of support rib 22 is the same as that of an ordinary support rib of a shaped resin article produced by the conventional injection molding methods, that is, not larger than a half of the thickness t1 of bottom wall 23.

Figure 15:
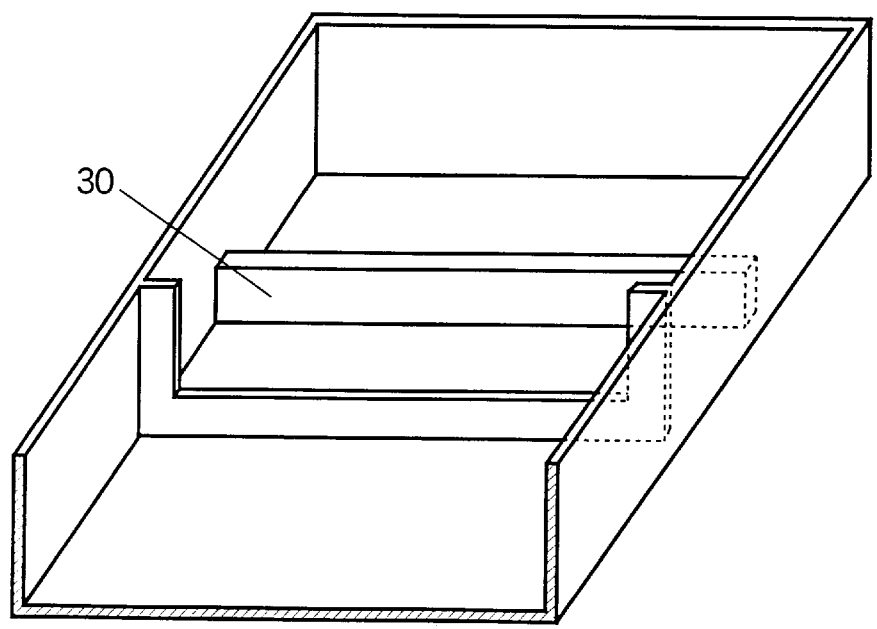
FIG. 15 is a diagrammatic, partly cut-away, perspective view of a further form of a shaped resin article produced by the method of the present invention.

In the production of shaped resin article 19 shown in FIG. 12 and FIGS. 13(a) to 13(c), use is made of a mold which has a mold cavity having an internal morphology adapted for production of shaped resin article 19 and in which a gas inlet is provided at a position in the first inner wall of the mold cavity which corresponds to portion 26 of shaped resin article 19, wherein the position of the gas inlet may be arbitrarily selected as long as it is within region 25 of FIG. 13(a) corresponding to the molten resin/first inner wall interface. Also, at least one other gas inlet is provided at a position in the first inner wall of the mold cavity which corresponds to a portion of the back surface of the shaped resin article other than region 25 of FIG. 13(a) corresponding to the molten resin/first inner wall interface. A resin in a molten form is injected into the mold cavity of the mold to perform an excess filling of the mold cavity, and a pressurized gas is introduced through the gas inlets into the mold cavity on a side of the first surface of the molten resin mass, to form a closed space which is filled with the pressurized gas at least at a portion corresponding to region 25 of FIG. 13(a). After solidification of the molten resin mass by cooling, shaped resin article 19 is obtained. In the present invention, the mold may also be adapted for production of a shaped resin article such as shown in FIG. 15, which has large thickness rib 30 positioned within a region corresponding to an expanded, molten resin/first inner wall interface formed during the injection molding operation.

Figure 16:
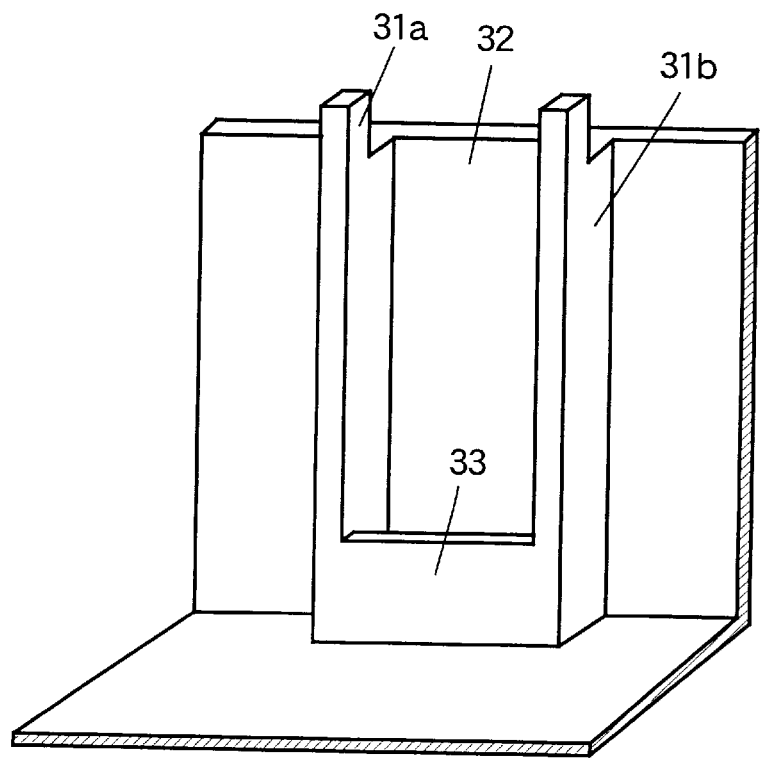
FIG. 16 is a diagrammatic, partly cut-away, perspective view of still a further form of a shaped resin article produced by the method of the present invention.
Figure 17:
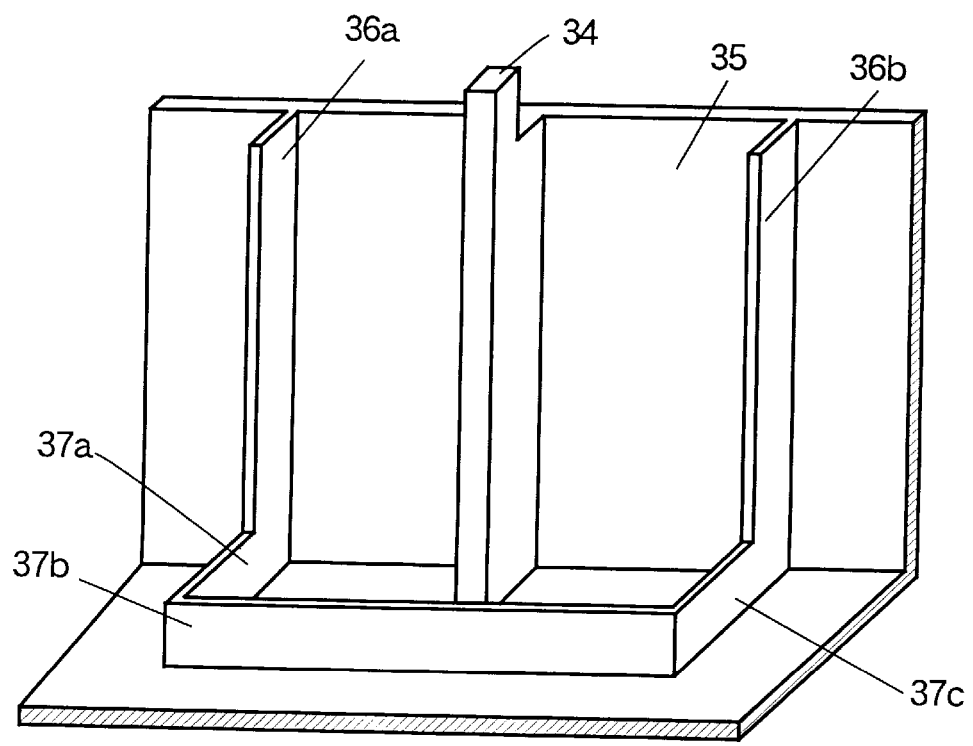
FIG. 17 is a diagrammatic, partly cut-away, perspective view of still a further form of a shaped resin article produced by the method of the present invention.

Further, as shown in FIG. 16, there may also be produced a shaped resin article having a structure in which large thickness ribs 31a and 31b which are connected to each other by support rib 33 are connected to side wall 32 to form a region corresponding to an expanded, molten resin/first inner wall interface formed during the injection molding operation. Furthermore, as shown in FIG. 17, there may also be produced a shaped resin article having a structure in which large thickness rib 34 is connected to side wall 35 and in which support ribs 36a and 36b, which are connected to each other through support ribs 37a, 37b and 37c, are connected to side wall 35 so as to surround large thickness rib 34, thereby causing large thickness rib 34 to be positioned within a region corresponding to an expanded, molten resin/first inner wall interface formed during the injection molding operation.

BEST MODE FOR CARRYING OUT THE INVENTION

The present invention will be described in more detail with reference to the following Examples, and Comparative Examples, which should not be construed as limiting the scope of the present invention.

In the Examples and Comparative Examples, the above-defined weight (VW) of the molten resin was measured by the following method. First, an injection molding is performed by injecting a relatively small weight amount of the resin in a molten form (under the temperature and pressure conditions for the injection indicated in the Examples and Comparative Examples) into the mold cavity of the mold through the resin inlet. The shaped resin article obtained by the above injection molding is observed to confirm that the shape of the resin article is incomplete, relative to the internal morphology of the mold cavity, indicating that the injected molten resin does not yet fill the mold cavity. Substantially the same injection molding as above is repeated without applying compression, except that the weight amount of the resin is gradually, slightly increased until a shaped resin article conforming to the entire internal morphology of the mold cavity is obtained. The weight amount of the molten resin used for obtaining the shaped resin article conforming to the entire internal morphology of the mold cavity is measured, and is taken as the above-defined weight (VW) of the molten resin.

EXAMPLE 1

Figure 18:
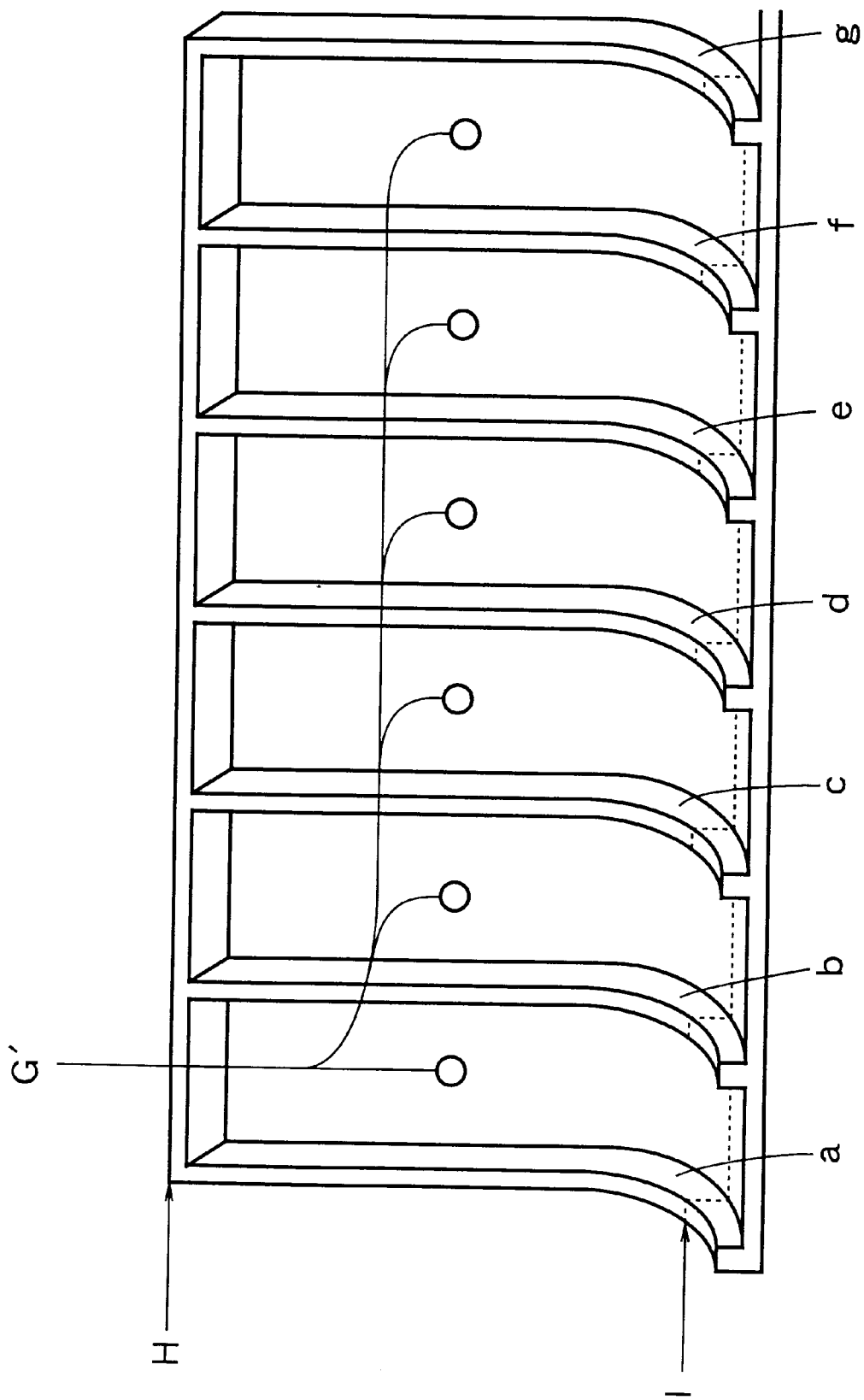
FIG. 18 is a diagrammatic perspective view of the shaped resin article produced in Example 1.

Using a mold having substantially the same construction as shown in FIG. 1, shaped resin articles each having a configuration as shown in FIG. 18 (which has a J-shaped cross-section and a plurality of ribs designated as a to g in FIG. 18) and a thickness of 2.5 mm at a rib-free portion thereof were produced.

In the mold employed, at a portion thereof which corresponds to a portion H of the shaped resin article of FIG. 18, movable mold half 1b mates with fixed mold half 1a in a manner as shown in FIG. 2, whereas, at a portion of the mold which corresponds to a portion I of the shaped resin article of FIG. 18, movable mold half 1b mates with fixed mold half 1a in a manner as shown in FIG. 3. Further, in this mold, the inner openings of the gas release passages are formed at portions of the inner wall of movable mold half 1b, which correspond to portions G' of the shaped resin article of FIG. 18 [each portion G' is located between two neighboring ribs in the back surface of the shaped resin article (corresponding to the first surface of the molten resin mass)].

Shaped resin articles were, respectively, produced from a high-impact polystyrene (HIPS) [Styron (registered trademark): manufactured and sold by Asahi Kasei Kogyo Kabushiki Kaisha, Japan), an ABS resin [Stylac (registered trademark): manufactured and sold by Asahi Kasei Kogyo Kabushiki Kaisha, Japan] and a modified polyphenylene ether resin (m-PPE) [Xyron (registered trademark): manufactured and sold by Asahi Kasei Kogyo Kabusiki Kaisha, Japan].

With respect to each of the shaped resin articles, the thicknesses of ribs a, b, c, d, e, f and g were 2.5 mm, 2.5 mm, 1.5 mm, 3.75 mm, 2.5 mm, 1.25 mm and 2.5 mm, respectively.

The procedures conducted in Example 1 are described in detail below.

The conditions for the injection molding in runs (A), (B) and (C) were as follows.

Run (A)
Resin used as a material: HIPS
Cylinder temperature: 200° C.
Temperature of the mold: 40° C.
Injection pressure: 125 MPa
Holding pressure applied to the injected molten resin: 25 MPa
Holding time of the pressure applied to the injected molten resin: 5 seconds
Pressurized gas: $N_2$ (nitrogen gas)
Pressure of the pressurized gas: 10 MPa
Introduction time of the pressurized gas: 5 seconds
Holding time of the pressure of the pressurized gas in the mold cavity: 20 seconds Run (B)
Resin used as a material; ABS resin
Cylinder temperature: 230 ° C.
Temperature of the mold: 60° C.
Injection pressure: 125 MPa
Holding pressure applied to the injected molten resin: 25 MPa
Holding time of the pressure applied to the injected molten resin: 5 seconds
Pressurized gas: $N_2$ (nitrogen gas)
Pressure of the pressurized gas: 10 MPa
Introduction time of the pressurized gas: 5 seconds
Holding time of the pressure of the pressurized gas in the mold cavity: 20 seconds Run (C)
Resin used as a material: m-PPE
Cylinder temperature: 260° C.
Temperature of the mold: 60° C.
Injection pressure: 125 MPa
Holding pressure applied to the injected molten resin: 25 MPa
Holding time of the pressure applied to the injected molten resin: 5 seconds
Pressure of the pressurized gas: 10 MPa
Introduction time of the pressurized gas: 5 seconds
Holding time of the pressurized gas in the mold cavity: 20 seconds In Example 1, the weight of the molten resin injected into the mold cavity was 103%, based on the above-defined weight (VW) of the molten resin.

The injection molding in each of runs (A) to (C) was conducted as follows.

The resin was charged into an injection molding machine through a hopper thereof, and was heated in the cylinder at a temperature described above, thereby obtaining a molten resin. Then, the molten resin was injected into the mold cavity (the temperature of the mold is as described above) with the resin pressure as described above. After completion of the injection of the molten resin, a pressurized gas which was supplied from a source therefor (pressure tank) was immediately introduced into the mold cavity 2 through port 10 and gas introduction pin 8. Specifically, the gas valve of the pressure tank was opened for 5 seconds and then, the valve was closed. Further, simultaneously with the introduction of the pressurized gas, a holding pressure was applied to the injected molten resin for 5 seconds by means of the cylinder. After closing the gas valve, the pressurized $N_2$ gas was retained in the mold cavity for 20 seconds and then, withdrawn from the mold cavity. The molten resin in the mold cavity was cooled for 30 seconds from the completion of the injection, to thereby allow the molten resin to solidify. Next, the movable mold half 1b was separated from the fixed mold half 1a to open the mold. The pushing rod 6 was moved to push the ejector pin-supporting plate 14, so that the ejector pins served to eject the shaped article from movable mold half 1b. The shaped resin article was visually observed to evaluate the appearance of the shaped resin article and check whether or not warpage of the shaped resin article occurred. Then, the front surface of the shaped resin article (corresponding to the second surface of the molten resin mass) was tested for the occurrence of sink marks by means of a surface roughness tester (SURFTEST 500, manufactured and sold by Mitutoyo Corporation, Japan). That is, the displacement on the front surface of the resin article in a direction orthogonal thereto was measured, and was taken as a depth ($\mu$m) of a sink mark. The measurement of displacement was effected with respect to a portion of the front surface around the axis of rib d formed on the back surface. Results are shown in Table 1.

COMPARATIVE EXAMPLE 1

Substantially the same procedure as in Example 1 was repeated, except that conditions for the injection molding were changed as described below.

The conditions for the injection molding in runs (A'), (B') and (C') were as follows.

Run (A')
Resin used as a material: HIPS
Cylinder temperature: 200° C.
Temperature of the mold; 40° C.
Injection pressure: 125 MPa
Holding pressure applied to the injected molten resin: 50 MPa
Holding time of the pressure applied to the injected molten resin: 5 seconds Run (B')
Resin used as a material: ABS resin
Cylinder temperature; 230° C.
Temperature of the mold: 60° C.
Injection pressure: 125 MPa
Holding pressure applied to the injected molten resin: 50 MPa
Holding time of the pressure applied to the injected molten resin: 5 seconds Run (C')
Resin used as a material: m-PPE
Cylinder temperature: 260° C.
Temperature of the mold: 60° C.
Injection pressure: 125 MPa
Holding pressure applied to the injected molten resin: 50 MPa
Holding time of the pressure applied to the injected molten resin: 5 seconds
Results are shown in Table 1.

TABLE 1

| | Resin used as a material | | | | | |
|---|---|---|---|---|---|---|
| | HIPS | | ABS | | m-PPE | |
| Evaluation items | Example 1 | Comparative Example 1 | Example 1 | Comparative Example 1 | Example 1 | Comparative Example 1 |
| Appearance | Excellent*[1] | Poor*[2] | Excellent | Poor | Excellent | Poor |
| Sink mark | 10.9 μm | 126 μm | 2.2 μm | 99.9 μm | 3.3 μm | 111 μm |
| Warpage | Small | Large | Small | Large | Small | Large |

*[1]Non-uniformity in gloss and luster was not observed.
*[2]Non-uniformity in gloss and luster was observed.

As is apparent from Table 1, each of the shaped resin articles produced by the method of the present invention is excellent with respect to the appearance and sink mark-freedom of the front surface of the shaped resin article. That is, by the method of the present invention, it has for the first time become possible to produce a shaped resin article having a large thickness rib without suffering from the occurrence of a sink mark.

EXAMPLE 2

Figure 19:
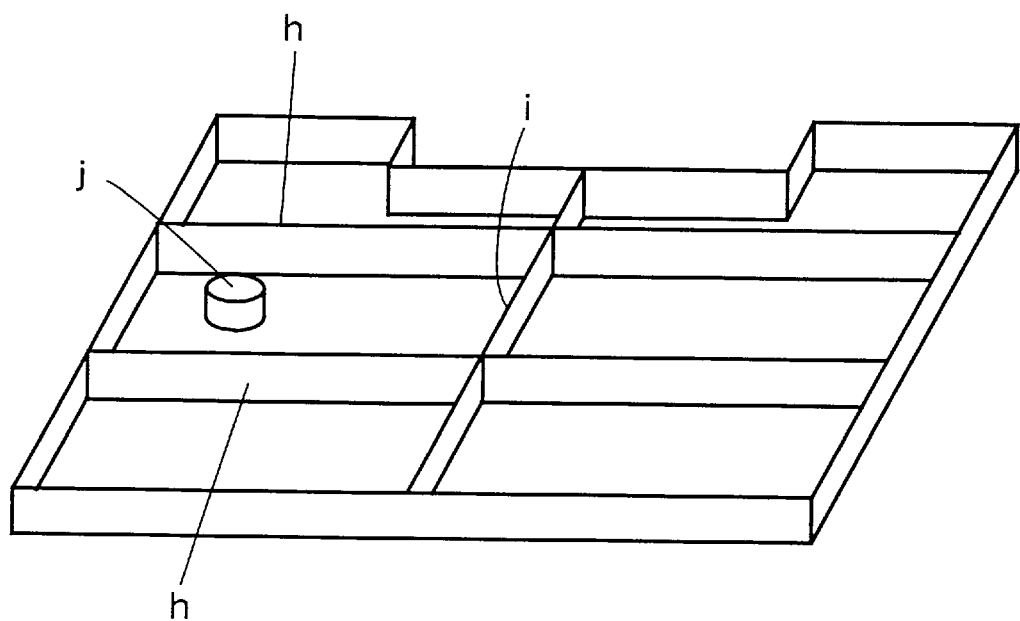
FIG. 19 is a diagrammatic perspective view of the shaped resin article produced in Example 2.

Using a mold having substantially the same construction as shown in FIG. 1 shaped resin articles each having a configuration as shown in FIG. 19 (which is a plate-shaped article for use as a casing of an office automation machine, which has side walls, ribs designated as h and i, and a boss designated as j in FIG. 19) and a thickness of 2.0 mm at a rib- and boss-free portion thereof were produced.

Shaped resin articles were, respectively, produced from a high-impact polystyrene (HIPS), an ABS resin and a modified polyphenylene ether resin (m-PPE).

With respect to the shaped resin articles, the thicknesses of ribs h and i were 2 mm and 4 mm, respectively.

The conditions for the injection molding in runs (A), (B) and (C) were as follows.
Run (A)
Resin used as a material: HIPS
Cylinder temperature: 200° C.
Temperature of the mold: 40° C.
Injection pressure: 125 MPa
Holding pressure applied to the injected molten resin: 25 MPa
Holding time of the pressure applied to the injected molten resin: 9 seconds
Pressurized gas: N$_2$ (nitrogen gas)
Pressure of the pressurized gas: 10 MPa
Introduction time of the pressurized gas: 3 seconds
Holding time of the pressure of the pressurized gas in the mold cavity: 20 seconds
Run (B)
Resin used as a material: ABS resin
Cylinder temperature: 230° C.
Temperature of the mold: 60° C.
Injection pressure: 125 MPa
Holding pressure applied to the injected molten resin: 25 MPa
Holding time of the pressure applied to the injected molten resin: 9 seconds
Pressurized gas: N$_2$ (nitrogen gas)
Pressure of the pressurized gas: 10 MPa
Introduction time of the pressurized gas: 3 seconds
Holding time of the pressure of the pressurized gas in the mold cavity: 20 seconds
Run (C)
Resin used as a material: m-PPE
Cylinder temperature: 260° C.
Temperature of the mold: 60° C.
Injection pressure: 125 MPa
Holding pressure applied to the injected molten resin: 25 MPa
Holding time of the pressure applied to the injected molten resin: 9 seconds
Pressure of the pressurized gas: 10 MPa
Introduction time of the pressurized gas: 3 seconds
Holding time of the pressurized gas in the mold cavity: 20 seconds In Example 2, the weight of the molten resin injected into the mold cavity was 104%, based on the above-defined weight (VW) of the molten resin.

Results are shown in Table 2

COMPARATIVE EXAMPLE 2

Substantially the same procedure as in Example 1 was repeated, except that the conditions for the injection molding were changed as described below.

The conditions for the injection molding in runs (A'), (B') and (C') were as follows.
Run (A')
Resin used as a material: HIPS
Cylinder temperature: 200° C.
Temperature of the mold: 40° C.
Injection pressure: 125 MPa
Holding pressure applied to the injected molten resin: 50 MPa
Holding time of the pressure applied to the injected molten resin: 5 seconds
Run (B')
Resin used as a material: ABS resin
Cylinder temperature: 230° C.
Temperature of the mold: 60° C.
Injection pressure: 125 MPa
Holding pressure applied to the injected molten resin; 50 MPa
Holding time of the pressure applied to the injected molten resin: 5 seconds
Run (C')
Resin used as a material: m-PPE
Cylinder temperature: 260° C.
Temperature of the mold: 60° C.
Injection pressure: 125 MPa
Holding pressure applied to the injected molten resin: 50. MPa
Holding time of the pressure applied to the injected molten resin: 5 seconds
Results are shown in Table 2.

TABLE 2

| | Resin used as a material | | | | | |
|---|---|---|---|---|---|---|
| | HIPS | | ABS | | m-PPE | |
| Evaluation items | Example 1 | Comparative Example 1 | Example 2 | Comparative Example 2 | Example 3 | Comparative Example 3 |
| Appearance | Excellent*1 | Poor*2 | Excellent | Poor | Excellent | Poor |
| Sink mark | None | Observed | None | Observed | None | Observed |
| Warpage | Small | Large | Small | Large | Small | Large |

*1 Non-uniformity in gloss and luster was not observed.
*2 Non-uniformity in gloss and luster was observed.

EXAMPLE 3

Figure 20:
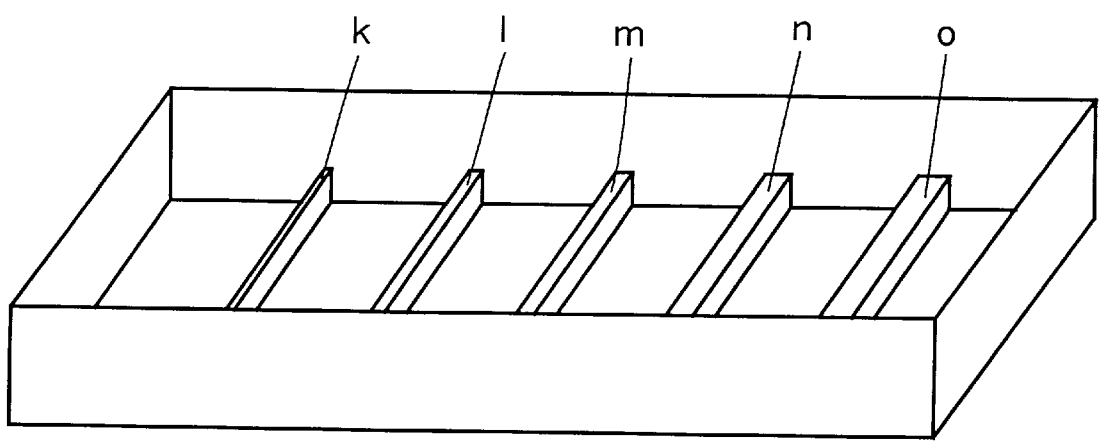
FIG. 20 is a diagrammatic perspective view of the shaped resin article produced in Example 3.

Using a mold having substantially the same construction as shown in FIG. 1, shaped resin articles each having a configuration as shown in FIG. 20 (which has side walls and ribs designated as k to o in FIG. 20) and a thickness of 2.0 mm at a rib-free portion thereof were produced.

Shaped resin articles were produced from the same ABS resin as used in Example 1.

With respect to each of the shaped resin articles, the thicknesses of ribs k, 1, m, n and o were 1.0 mm, 1.5 mm, 2.0 mm, 3.0 mm and 4.0 mm, respectively.

The conditions for the injection molding were as follows.
Resin used as a material: ABS
Cylinder temperature: 240° C.

The results of a gas-sealing ability of the mold employed and an amount of sink mark of the shaped resin article obtained in each of Example 3 and Comparative Example 3 are shown in Table 3.

With respect to each of the molds employed in Examples 3 and Comperative Example 3, the gas-sealing ability was evaluated in terms of the pressure of the pressurized gas after the holding time of the pressure of the pressurized gas in the mold cavity, wherien the higher the pressure of the pressurized gas after the holding time, the higher the gas-sealing ability.

TABLE 3

| | Example 3 | Example 3 | Example 3 | Example 3 | Example 3 | Comparative Example 3 | Comparative Example 3 |
|---|---|---|---|---|---|---|---|
| Filling ratio (wt %) | 100.5 | 101 | 102 | 103 | 104 | 100 | 99 |
| Gas-sealing effect (MPa) | 8.5 | 9.5 | 10.5 | 11.0 | 11.0 | 3.5 | 0 |
| Sink mark ($\mu$m) | None | None | None | None | None | Some a few | Observed |
| Appearance | Excellent | Excellent | Excellent | Excellent | Excellent | Poor | Poor |

Temperature of the mold: 60° C.
Injection pressure: 175 MPa
Holding pressure applied to the injected molten resin: 0 MPa
Pressure of the pressurized gas: 15 MPa
Introduction time of the pressurized gas: 3 seconds
Holding time of the pressure of the pressurized gas in the mold cavity: 20 seconds In the injection molding operations for the shaped resin articles, the weights of the injected molten resins were 100.5%, 101%, 102%, 103% and 104%, respectively, based on the above-defined weight (VW) of the molten resin.

In Example 3, in addition to the evaluations of the shaped resin articles, evaluation is made with respect the gas-sealing ability of the mold employed.

COMPARATIVE EXAMPLE 3

Shaped resin articles were produced in substantially the same manner as in Example 3, except that the weights of the injected molten resins in the injection molding operations were changed. That is, in the injection molding operations, the weights of the injected molten resins were 99% and 100%, respectively, based on the above-defined weight (VW) of the molten resin.

As is apparent from Table 3, by the injection molding method of the present invention, in which a mold having good gas-release characteristics is used and the excess filling as defined in the present invention is effected, it is possible to prevent the escape of the pressurized gas from the mold cavity and the occurrence of a sink mark at a portion of the front surface of the shaped resin article which is positioned opposite to the large thickness rib of the shaped resin article.

EXAMPLE 4

Figure 21:
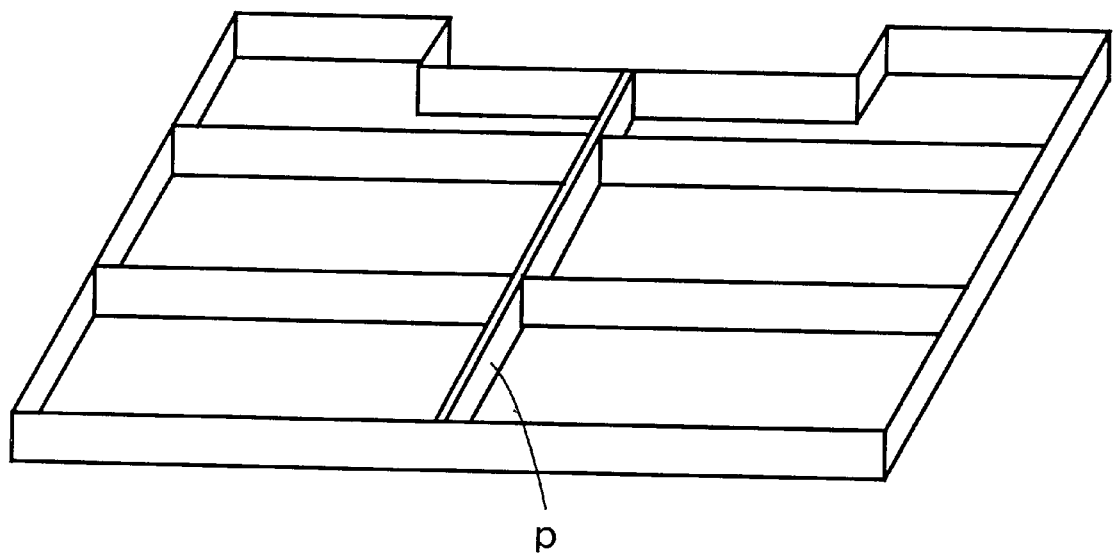
FIG. 21 is a diagrammatic perspective view of the shaped resin article produced in Example 4.

Using a mold having substantially the same construction, shaped resin articles each having a configuration as shown in FIG. 21 (which is a plate-shaped article for use as a casing of an office automationh machine and which has side walls and a plurality of ribs including rib p) and a thickness of 2.0 mm at a rib-free portion thereof were produced.

The mole employed has a non-sealed construction, in which the clearance between the movable mold half and the fixed mold half was utilized as a gas-release passage.

Shaped resin articles were produced from the same ABS resin as that used in Example 1.

With respect to each of the shaped resin articles, the thicknesses of rib p was 3 mm.

The conditions for the injection molding were as follows.
Resin used as a material: ABS
Cylinder temperature: 240° C.
Temperature of the mold: 60° C.
Injection pressure: 175 MPa
Holding pressure applied to the injected molten resin: 0 MPa
Pressurized gas: $N_2$ (nitrogen gas)
Pressure of the pressurized gas: 15 MPa
Introduction time of the pressurized gas: 3 seconds
Holding time of the pressure of the pressurized gas in the mold cavity: 20 seconds In Example 4, the weights of the injected molten resins were 100.5%, 101%, 102%, 103% and 104%, respectively, based on the above-defined weight (VW) of the molten resin.

As a comparison, shaped articles are produced in substantially the same manner as mentioned above, except that the weights of the injected molten resins injected into the mold cavity were 99.5% and 100%, based on the above-defined weight (VW) of the molten resin (i.e., the excess filling as defined in the present invention was not affected).

The front surface of each of the shaped resin articles was tested for occurrence of sink marks in the same manner as in Example 1 (the test was conducted with respect to the portion of the front surface of the shaped article which is positioned opposite to rib p). Results are shown in Table 4.

COMPARATIVE EXAMPLE 4

Shaped resin articles each having a configuration as shown in FIG. 21 (which is a plate-shaped article for use as a casing of an office outomationh machine and which has side walls and a plurality of ribs including rib p) and a thickness of 2.0 mm at a rib-free portion thereof were produced, in substantially the same manner as in Example 4, except that the mold employed had a completely gas-tightly sealed constructions, in which the clearance between the movable mold half and the fixed mold half was sealed by means of O-rings.

The front surface of each of the shaped resin articles were tested for occurrence of sink marks in the same manner as in Example 1 (the test was conducted with respect to the portion of the front surface of the shaped article which is positioned opposite to rib p).

Results are shown in Table 4.

a tightly sealed construction. Further, in the method of the present invention, when the excess filling ratio as used in the Examples are used, shaped resin articles can be produced without the danger of occurrence of burr.

INDUSTRIAL APPLICABILITY

By using the injection molding method of the present invention, great advantages can be obtained not only in that the occurrence of a sink mark can be effectively prevented without the occurrence of burrs, thereby producing a shaped resin article having an excellent surface finish, but also in that there is no need for use of a completely gas-tightly sealed mold which requires a high equipment cost and a high maintenance cost, and that an injection molding can be performed with a relatively low excess-filling ratio, as compared to the conventional excess-filling injection molding method. Thus, the injection molding method of the present invention is very advantageous for commercially producing shaped articles having a shaped article having an improved surface finish, i.e., a shaped article which exhibits excellent gloss and luster and an excellent reproduction of the configuration of a cavity inner wall of a mold cavity and which is free of sink marks.

We claim:

1. A method for the injection molding of a resin to produce a shaped resin article having, on a back surface thereof, a locally protruded portion at which the shaped resin article has an increased thickness, which comprises:

(1) providing a mold comprising a fixed mold half and a movable mold half mating with said fixed mold half to thereby provide a mold cavity, said mold cavity having opposite, first and second inner walls and communicating with a resin inlet and with a gas inlet, said first inner wall of the mold cavity having at least one recess, said mold having a gas-release passage formed in association with said mold cavity and with a mating surface of said mold, wherein said gas-release passage has an inner opening in an inner wall surface of said mold cavity and communicates with the outside of said mold;

(2) closing said mold;

(3) injecting a resin in a molten form, under preselected

TABLE 4

| | Filing ratio (wt %) | *99.5 (Comparative) | *100 (Comparative) | 100.5 | 101 | 102 | 103 | 104 | 105 |
|---|---|---|---|---|---|---|---|---|---|
| Sink mark ($\mu$m) | Example 4 (Mold having a gas-release passage) | (14) | (7.5) | 5 | 4.5 | 4 | 3.5 | 3.5 | 3.5 |
| | Comparative Example 4 (Mold having a sealed construction) | 27 | 13 | 6.5 | 6 | 6.5 | 7 | 4.5 | 4 |

*Though the mold having a gas-release passage was employed, the excess filling as defined in the present invention was not effected As is apparent from Table 4, by the method of the present invention, by the use of a mold having a non-sealed construction, excellent sink-mark preventing effect is achieved with a relatively low level of the excess filling, as compared to the case in which use is made of a mold having temperature and pressure conditions for the injection, into the mold cavity of said mold through said resin inlet in an amount in weight larger than the weight (VW) of the molten resin having a resin volume equal to the volume of said mold cavity, wherein the resin volume is as measured at said preselected injection temperature under atmospheric pressure, thereby effecting an excess filling of said mold cavity with the molten resin to form a molten resin mass having opposite, first and second surfaces respectively facing said first and second inner walls of said mold cavity, while allowing a gas present in said mold cavity to be released to the outside of said mold cavity through said gas-release passage, wherein said first surface of the molten resin mass and said first inner wall of the mold cavity form a molten resin/first inner wall interface therebetween; and (4) introducing a pressurized gas, which is inert to said resin, into said mold cavity on a side of said first surface of the molten resin mass to expand said molten resin/first inner wall interface, thereby forming a closed space which is filled with said pressurized gas and separated from the gas-release passage through the molten resin mass, so that said pressurized gas filled in said closed space urges said second surface of the molten resin mass to be pressed against said second inner wall of the mold cavity; and wherein said fixed and movable mold halves remain closed during steps (3) and (4); and (5) opening said mold and removing said shaped resin article therefrom;

wherein said first and second surfaces of the molten resin mass, respectively, correspond to back and front surfaces of said shaped resin article produced by injection molding.

2. The method according to claim 1, wherein said gas-release passage is a slit formed along the mating surface of said mold.

3. The method according to claim 2, wherein said slit has, in a cross-section thereof, a thickness of from $1/100$ mm to $1/10$ mm at least in the vicinity of said inner opening of the gas-release passage.

4. The method according to any one of claims 1 to 3, wherein the weight of the molten resin injected into the mold cavity is 101% or more, based on the weight (VW) of the molten resin.

5. The method according to any one of claim 1 to 3, wherein, after the injection of the molten resin in step (3), a predetermined holding pressure is applied to the injected molten resin.

6. The method according to claim 5, wherein said predetermined holding pressure continues to be applied during the introduction of a pressurized gas in step (4).

7. The method according to any one of claims 1 to 3, wherein the weight of the molten resin injected into the mold cavity is 100.5% or more, based on the weight (VW) of the molten resin.

* * * * *